United States Patent
Chang et al.

(10) Patent No.: US 10,372,343 B2
(45) Date of Patent: *Aug. 6, 2019

(54) STORAGE SYSTEM, METHOD, AND APPARATUS FOR PROCESSING OPERATION REQUEST

(71) Applicant: HUAWEI TECHNOLOGIES CO.,LTD., Shenzhen, Guangdong (CN)

(72) Inventors: Sheng Chang, Hangzhou (CN); Xinyu Hou, Hangzhou (CN); Haitao Guo, Hangzhou (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/103,871

(22) Filed: Aug. 14, 2018

(65) Prior Publication Data

US 2018/0349028 A1 Dec. 6, 2018

Related U.S. Application Data

(63) Continuation of application No. 15/912,275, filed on Mar. 5, 2018, now Pat. No. 10,061,519, which is a
(Continued)

(51) Int. Cl.
*G06F 3/00* (2006.01)
*G06F 3/06* (2006.01)
(Continued)

(52) U.S. Cl.
CPC .......... *G06F 3/061* (2013.01); *G06F 3/0665* (2013.01); *G06F 3/0689* (2013.01); *G06F 12/00* (2013.01);
(Continued)

(58) Field of Classification Search
CPC .............................. G06F 3/061; G06F 13/387
See application file for complete search history.

(56) References Cited

U.S. PATENT DOCUMENTS

| 5,491,812 A | 2/1996 | Pisello et al. |
| 6,247,060 B1 | 6/2001 | Boucher et al. |
| (Continued) | | |

FOREIGN PATENT DOCUMENTS

| CN | 103828332 A | 5/2014 |
| CN | 103984662 A | 8/2014 |
| (Continued) | | |

OTHER PUBLICATIONS

Erwin van londen, "SoE, SCSI over Ethernete", from http://erwinvanlonden.net/2011/05/soe-scsi-over-ethernet/, May 31, 2011, 1 page.

*Primary Examiner* — Tammara R Peyton
(74) *Attorney, Agent, or Firm* — Huawei Technologies Co., Ltd.

(57) ABSTRACT

According to a storage system, method, and apparatus for processing an operation request provided by embodiments of the present invention, a controller directly encapsulates a SCSI protocol operation request into an Ethernet operation request packet at the MAC layer instead of using the TCP/IP protocol layer and a disk enclosure decapsulates the Ethernet operation request to obtain the SCSI protocol operation request and sends the SCSI protocol operation request to a target disk, thereby reducing layers of encapsulation, reducing a processing delay of the storage system, and improving performance of the storage system.

20 Claims, 10 Drawing Sheets

Related U.S. Application Data continuation of application No. 15/641,583, filed on Jul. 5, 2017, now Pat. No. 9,940,032, which is a continuation of application No. 14/728,178, filed on Jun. 2, 2015, now Pat. No. 9,753,650, which is a continuation of application No. PCT/CN2014/084255, filed on Aug. 13, 2014.

(51) Int. Cl.
*G06F 13/38* (2006.01)
*G06F 13/42* (2006.01)
*G06F 12/00* (2006.01)

(52) U.S. Cl.
CPC ........ *G06F 13/387* (2013.01); *G06F 13/4221* (2013.01); *G06F 13/4282* (2013.01)

(56) References Cited

U.S. PATENT DOCUMENTS

| | | | |
|---|---|---|---|
| 7,165,258 | B1 | 1/2007 | Kuik et al. |
| 7,480,303 | B1 | 1/2009 | Ngai |
| 7,769,842 | B2 | 8/2010 | Weber |
| 7,917,682 | B2 | 3/2011 | Bakthavathsalam |
| 8,140,696 | B2 | 3/2012 | Ko |
| 8,499,094 | B2 | 7/2013 | Coile et al. |
| 8,812,707 | B2 | 8/2014 | Singh et al. |
| 9,753,650 | B2 | 9/2017 | Chang et al. |
| 9,940,032 | B2 | 4/2018 | Chang et al. |
| 10,061,519 | B2 * | 8/2018 | Chang .................... G06F 3/061 |
| 2003/0018828 | A1 | 1/2003 | Craddock et al. |
| 2007/0033566 | A1 | 2/2007 | Weber |
| 2008/0056300 | A1 | 3/2008 | Williams |
| 2008/0159260 | A1 | 7/2008 | Vobbilisetty et al. |
| 2008/0228897 | A1 | 9/2008 | Ko |
| 2009/0254677 | A1 | 10/2009 | Desanti |
| 2010/0061376 | A1 | 3/2010 | Shimizu |
| 2012/0059978 | A1 | 3/2012 | Rosenband et al. |
| 2012/0303701 | A1 | 11/2012 | Singh et al. |
| 2014/0012940 | A1 | 1/2014 | Joshi et al. |
| 2016/0285648 | A1 | 9/2016 | Fan et al. |

FOREIGN PATENT DOCUMENTS

| | | |
|---|---|---|
| EP | 3062230 A1 | 8/2016 |
| JP | 2004531001 A | 10/2004 |

* cited by examiner

| SCSI protocol transaction identifier of a controller | 001 | 002 | | 0099 |
|---|---|---|---|---|
| MAC address of a back-end adapter | 44-45-53-54-00-00 | 00-16-EA-AE-3C-40 | | 00-23-5A-15-99-42 |

FIG. 4

| Disk number | 1031 | 1032 | ... | 104n |
|---|---|---|---|---|
| SAS protocol address of a disk | 001 | 002 | ... | 0099 |
| MAC address of a disk enclosure | 44-45-53-54-00-00 ||||

STORAGE SYSTEM, METHOD, AND APPARATUS FOR PROCESSING OPERATION REQUEST

CROSS-REFERENCE TO RELATED APPLICATIONS

This application is a continuation of U.S. patent application Ser. No. 15/912,275, filed on Mar. 5, 2018, which is a continuation of U.S. patent application Ser. No. 15/641,583, filed on Jul. 5, 2017, now U.S. Pat. No. 9,940,032, which is a continuation of U.S. patent application Ser. No. 14/728,178, filed on Jun. 2, 2015, now U.S. Pat. No. 9,753,650, which is a continuation of International Application No. PCT/CN2014/084255, filed on Aug. 13, 2014. All of the aforementioned patent applications are hereby incorporated by reference in their entireties.

TECHNICAL FIELD

The present invention relates to the field of information technologies, and in particular, to a storage system, a method, and an apparatus for processing an operation request.

BACKGROUND

The Internet Small Computer System Interface (iSCSI) protocol is a network storage protocol developed by the IETF, and is aimed at implementing communication between storage devices using the Internet Protocol (IP). In a storage system, the Small Computer System Interface (SCSI) protocol is used on an IP protocol network for communication, that is, the iSCSI protocol is used for communication, which promotes development of storage technologies and implements long-distance transmission of data. In one application scenario, a storage system includes a controller, a disk enclosure, and multiple disks. The controller communicates with the disk enclosure using the iSCSI protocol, the multiple disks are connected in the disk enclosure, and the disk enclosure and the multiple disks connected in the disk enclosure are jointly called Just a Bunch Of Disks (JBOD). In this scenario, the controller and the disk enclosure are separate, thereby implementing flexible deployment.

The controller communicates with the disk enclosure using the iSCSI protocol. For both the controller and the disk enclosure, the SCSI protocol needs to be first encapsulated using the Transport Control Protocol/Internet Protocol (TCP/IP), and then encapsulated by a media access control (MAC) layer. Similarly, a decapsulation process also involves MAC layer decapsulation and TCP/IP layer decapsulation. Multi-layer protocol encapsulation or decapsulation increases resource consumption of a Central Processing Unit (CPU) of the storage system and a processing delay of the storage system, and reduces performance of the storage system.

SUMMARY

Embodiments of the present invention provide a storage system, a method, and an apparatus for processing an operation request.

According to a first aspect, an embodiment of the present invention provides a storage system for processing an operation request, where the storage system includes a controller and a disk enclosure, and the controller communicates with the disk enclosure using an Ethernet network. The controller includes a central processing unit and a back-end adapter. The disk enclosure and the back-end adapter each have a media access control (MAC) address. Multiple disks are connected in the disk enclosure, and each disk in the disk enclosure is connected to the disk enclosure using the Serial Attached Small Computer System Interface (SAS) protocol. The back-end adapter stores a correspondence between the MAC address of the disk enclosure and a SAS protocol address of each disk in the disk enclosure. The back-end adapter is configured to receive a Small Computer System Interface (SCSI) protocol operation request sent by the central processing unit, where the SCSI protocol operation request carries a SCSI protocol transaction identifier of the controller and a SAS protocol address of a target disk, query a correspondence between the MAC address of the disk enclosure and the SAS protocol address of the target disk according to the SAS protocol address of the target disk to obtain the MAC address of the disk enclosure, encapsulate the SCSI protocol operation request into an Ethernet operation request packet, and send the Ethernet operation request packet to the disk enclosure according to the MAC address of the disk enclosure. The Ethernet operation request packet carries the MAC address of the back-end adapter and the MAC address of the disk enclosure. The disk enclosure is configured to receive and decapsulate the Ethernet operation request packet to obtain the SCSI protocol operation request, and send the SCSI protocol operation request to the target disk according to the SAS protocol address of the target disk.

In a first implementation of the first aspect, the disk enclosure is further configured to establish a correspondence between the MAC address of the back-end adapter and the SCSI protocol transaction identifier of the controller. The disk enclosure is further configured to receive a SCSI protocol operation request response that is sent by the target disk according to the SCSI protocol operation request, where the SCSI protocol operation request response carries the SCSI protocol transaction identifier of the controller, query the correspondence between the MAC address of the back-end adapter and the SCSI protocol transaction identifier of the controller according to the SCSI protocol transaction identifier of the controller to obtain the MAC address of the back-end adapter, encapsulate the SCSI protocol operation request response into an Ethernet operation request response packet, and send the Ethernet operation request response packet to the controller according to the MAC address of the back-end adapter. The Ethernet operation request response packet carries the MAC address of the back-end adapter. The back-end adapter is further configured to receive and decapsulate the Ethernet operation request response packet to obtain the SCSI protocol operation request response, and send the SCSI protocol operation request response to the central processing unit.

In a second implementation of the first aspect, the back-end adapter is further configured to encapsulate the SCSI protocol transaction identifier of the controller in the SCSI protocol operation request into a first field of the Ethernet operation request packet and encapsulate the SAS protocol address of the target disk in the SCSI protocol operation request into a second field of the Ethernet operation request packet. The first field, the second field, and a field carrying the SCSI protocol operation request are three different fields. That the disk enclosure establishes a correspondence between the MAC address of the back-end adapter and the SCSI protocol transaction identifier of the controller includes the disk enclosure decapsulates the first field of the Ethernet operation request packet to obtain the SCSI protocol transaction identifier of the controller and establishes the correspondence between the MAC address of the back-end adapter and the SCSI protocol transaction identifier of the controller. That the disk enclosure sends the SCSI protocol operation request to the target disk according to the SAS protocol address of the target disk includes the disk enclosure decapsulates the second field of the Ethernet operation request packet to obtain the SAS protocol address of the target disk and sends the SCSI protocol operation request to the target disk according to the SAS protocol address of the target disk.

According to a second aspect, an embodiment of the present invention provides a method for processing an operation request, where the method is applied to a controller. The controller communicates with a disk enclosure using an Ethernet network. The controller includes a central processing unit and a back-end adapter. The disk enclosure and the back-end adapter each have a media access control MAC address. Multiple disks are connected in the disk enclosure. Each disk in the disk enclosure is connected to the disk enclosure using the Serial Attached Small Computer System Interface SAS protocol. The back-end adapter stores a correspondence between the MAC address of the disk enclosure and a SAS protocol address of each disk in the disk enclosure. The method includes sending, by the central processing unit, a Small Computer System Interface SCSI protocol operation request, where the SCSI protocol operation request carries a SAS protocol address of a target disk, and receiving, by the back-end adapter, the SCSI protocol operation request sent by the central processing unit, querying a correspondence between the MAC address of the disk enclosure and the SAS protocol address of the target disk according to the SAS protocol address of the target disk to obtain the MAC address of the disk enclosure, encapsulating the SCSI protocol operation request into an Ethernet operation request packet carrying the MAC address of the back-end adapter and the MAC address of the disk enclosure, and sending the Ethernet operation request packet to the disk enclosure according to the MAC address of the disk enclosure.

In a first implementation of the second aspect, the SCSI protocol operation request further carries a SCSI protocol transaction identifier of the controller. The method further includes encapsulating the SCSI protocol transaction identifier of the controller into a first field of the Ethernet operation request packet and encapsulating the SAS protocol address of the target disk into a second field of the Ethernet operation request packet. The first field, the second field, and a field that is in the Ethernet operation request packet and carries the SCSI protocol operation request are three different fields.

In a second implementation, the method further includes receiving and decapsulating, by the back-end adapter, an Ethernet response packet for the Ethernet operation request packet that is sent by the disk enclosure to obtain a SCSI protocol operation request response, sending the SCSI protocol operation request response to the central processing unit, where the Ethernet response packet for the Ethernet operation request packet carries the MAC address of the back-end adapter, and receiving, by the central processing unit, the SCSI protocol operation request response.

According to a third aspect, an embodiment of the present invention provides a method for processing an operation request, where the method is applied to a disk enclosure. A controller communicates with the disk enclosure using an Ethernet network. The controller includes a central processing unit and a back-end adapter. The disk enclosure and the back-end adapter each have a media access control MAC address. Multiple disks are connected in the disk enclosure and each disk in the disk enclosure is connected to the disk enclosure using the Serial Attached Small Computer System Interface SAS protocol. receiving and decapsulating, by the disk enclosure, an Ethernet operation request packet sent by the controller to obtain a Small Computer System Interface SCSI protocol operation request, where the Ethernet operation request packet carries the MAC address of the back-end adapter and the MAC address of the disk enclosure, and the SCSI protocol operation request carries a SCSI protocol transaction identifier of the controller and a SAS protocol address of a target disk, and sending, by the disk enclosure, the SCSI protocol operation request to the target disk according to the SAS protocol address of the target disk.

The Method Includes

In a first implementation of the third aspect, the method further includes establishing, by the disk enclosure, a correspondence between the MAC address of the back-end adapter and the SCSI protocol transaction identifier of the controller, receiving, by the disk enclosure, a SCSI protocol operation request response that is sent by the target disk according to the SCSI protocol operation request, where the SCSI protocol operation request response carries the SCSI protocol transaction identifier of the controller, querying, by the disk enclosure, the correspondence between the MAC address of the back-end adapter and the SCSI protocol transaction identifier of the controller according to the SCSI protocol transaction identifier of the controller to obtain the MAC address of the back-end adapter, encapsulating, by the disk enclosure, the SCSI protocol operation request response into an Ethernet operation request response packet, where the Ethernet operation request response packet carries the MAC address of the back-end adapter, and sending, by the disk enclosure, the Ethernet operation request response packet to the controller according to the MAC address of the back-end adapter.

In a second implementation of the third aspect, a first field of the Ethernet operation request packet carries the SCSI protocol transaction identifier of the controller and a second field of the Ethernet operation request packet carries the SAS protocol address of the target disk. The first field, the second field, and a field that is in the Ethernet operation request packet and carries the SCSI protocol operation request are three different fields. The establishing, by the disk enclosure, a correspondence between the MAC address of the back-end adapter and the SCSI protocol transaction identifier of the controller includes decapsulating, by the disk enclosure, the first field of the Ethernet operation request packet to obtain the SCSI protocol transaction identifier of the controller and establishing the correspondence between the MAC address of the back-end adapter and the SCSI protocol transaction identifier of the controller, and the sending, by the disk enclosure, the SCSI protocol operation request to the target disk according to the SAS protocol address of the target disk includes decapsulating, by the disk enclosure, the second field of the Ethernet operation request packet to obtain the SAS protocol address of the target disk and sending the SCSI protocol operation request to the target disk according to the SAS protocol address of the target disk.

According to a fourth aspect, an embodiment of the present invention provides a controller, where the controller is applied to a storage system. The storage system includes the controller and a disk enclosure. The controller communicates with the disk enclosure using an Ethernet network. The controller includes a central processing unit and a back-end adapter. The disk enclosure and the back-end adapter each have a media access control MAC address. Multiple disks are connected in the disk enclosure, and each disk in the disk enclosure is connected to the disk enclosure using the Serial Attached Small Computer System Interface SAS protocol. The back-end adapter stores a correspondence between the MAC address of the disk enclosure and a SAS protocol address of each disk in the disk enclosure. The central processing unit is configured to send a Small Computer System Interface SCSI protocol operation request, where the SCSI protocol operation request carries a SAS protocol address of a target disk. The back-end adapter is configured to receive the SCSI protocol operation request, query a correspondence between the MAC address of the disk enclosure and the SAS protocol address of the target disk according to the SAS protocol address of the target disk to obtain the MAC address of the disk enclosure, encapsulate the SCSI protocol operation request into an Ethernet operation request packet, and send the Ethernet operation request packet to the disk enclosure according to the MAC address of the disk enclosure, where the Ethernet operation request packet carries the MAC address of the back-end adapter and the MAC address of the disk enclosure.

In a first implementation of the fourth aspect, the SCSI protocol operation request further carries a SCSI protocol transaction identifier of the controller. The back-end adapter is further configured to encapsulate the SCSI protocol transaction identifier of the controller into a first field of the Ethernet operation request packet and encapsulate the SAS protocol address of the target disk into a second field of the Ethernet operation request packet, where the first field, the second field, and a field that is in the Ethernet operation request packet and carries the SCSI protocol operation request are three different fields.

In a second implementation of the fourth aspect, the back-end adapter is further configured to receive and decapsulate an Ethernet response packet for the Ethernet operation request packet that is sent by the disk enclosure to obtain a SCSI protocol operation request response, and send the SCSI protocol operation request response to the central processing unit, where the Ethernet response packet for the Ethernet operation request packet carries the MAC address of the back-end adapter, and the central processing unit is further configured to receive the SCSI protocol operation request response.

According to a fifth aspect, an embodiment of the present invention provides a disk enclosure, where the disk enclosure is applied to a storage system, and the storage system includes a controller and the disk enclosure. The controller includes a central processing unit and a back-end adapter. The disk enclosure and the back-end adapter each have a media access control MAC address. Multiple disks are connected in the disk enclosure, and each disk in the disk enclosure is connected to the disk enclosure using the Serial Attached Small Computer System Interface SAS protocol. The controller communicates with the disk enclosure using an Ethernet network. The disk enclosure includes a first transceiver unit configured to receive an Ethernet operation request packet sent by the controller, where the Ethernet operation request packet carries the MAC address of the back-end adapter and the MAC address of the disk enclosure, an encapsulating and decapsulating unit, configured to decapsulate the Ethernet operation request packet received by the first transceiver unit to obtain a Small Computer System Interface SCSI protocol operation request, where the SCSI protocol operation request carries a SCSI protocol transaction identifier of the controller and a SAS protocol address of a target disk, and a second transceiver unit, configured to send the SCSI protocol operation request to the target disk according to the SAS protocol address of the target disk.

In a first implementation of the fifth aspect, the disk enclosure further includes an establishing unit and a querying unit, where the establishing unit is configured to establish a correspondence between the MAC address of the back-end adapter and the SCSI protocol transaction identifier of the controller, the second transceiver unit is further configured to receive a SCSI protocol operation request response that is sent by the target disk according to the SCSI protocol operation request, where the SCSI protocol operation request response carries the SCSI protocol transaction identifier of the controller, the querying unit is configured to query, according to the SCSI protocol transaction identifier of the controller, the correspondence between the MAC address of the back-end adapter and the SCSI protocol transaction identifier of the controller that is established by the establishing unit, to obtain the MAC address of the back-end adapter, the encapsulating and decapsulating unit is further configured to encapsulate the SCSI protocol operation request response into an Ethernet operation request response packet, where the Ethernet operation request response packet carries the MAC address of the back-end adapter, and the first transceiver unit is further configured to send the Ethernet operation request response packet to the controller according to the MAC address of the back-end adapter.

In a second implementation of the fifth aspect, a first field of the Ethernet operation request packet carries the SCSI protocol transaction identifier of the controller and a second field of the Ethernet operation request packet carries the SAS protocol address of the target disk, where the first field, the second field, and a field that is in the Ethernet operation request packet and carries the SCSI protocol operation request are three different fields, that the establishing unit establishes a correspondence between the MAC address of the back-end adapter and the SCSI protocol transaction identifier of the controller includes the encapsulating and decapsulating unit decapsulates the first field of the Ethernet operation request packet to obtain the SCSI protocol transaction identifier of the controller, and the establishing unit establishes the correspondence between the MAC address of the back-end adapter and the SCSI protocol transaction identifier of the controller, and that the second transceiver unit sends the SCSI protocol operation request to the target disk according to the SAS protocol address of the target disk includes the encapsulating and decapsulating unit decapsulates the second field of the Ethernet operation request packet, to obtain the SAS protocol address of the target disk, and the second transceiver unit sends the SCSI protocol operation request to the target disk according to the SAS protocol address of the target disk.

According to a sixth aspect, an embodiment of the present invention provides a back-end adapter, where the back-end adapter is applied to a controller of a storage system, and the storage system includes the controller and a disk enclosure. The controller communicates with the disk enclosure using an Ethernet network. The controller includes a central processing unit and the back-end adapter. The disk enclosure and the back-end adapter each have a media access control MAC address. Multiple disks are connected in the disk enclosure, and each disk in the disk enclosure is connected to the disk enclosure using the Serial Attached Small Computer System Interface SAS protocol. The back-end adapter stores a correspondence between the MAC address of the disk enclosure and a SAS protocol address of each disk in the disk enclosure. The back-end adapter includes a first transceiver unit, configured to send a Small Computer System Interface SCSI protocol operation request, where the SCSI protocol operation request carries a SAS protocol address of a target disk, a querying unit, configured to query a correspondence between the MAC address of the disk enclosure and the SAS protocol address of the target disk, to obtain the MAC address of the disk enclosure, an encapsulating and decapsulating unit, configured to encapsulate the SCSI protocol operation request into an Ethernet operation request packet, where the Ethernet operation request packet carries the MAC address of the back-end adapter and the MAC address of the disk enclosure, and a second transceiver unit, configured to send the Ethernet operation request packet to the disk enclosure according to the MAC address of the disk enclosure.

In a first implementation of the sixth aspect, the SCSI protocol operation request further carries a SCSI protocol transaction identifier of the controller. The encapsulating and decapsulating unit is further configured to encapsulate the SCSI protocol transaction identifier of the controller into a first field of the Ethernet operation request packet and encapsulate the SAS protocol address of the target disk into a second field, where the first field, the second field, and a field that is in the Ethernet operation request packet and carries the SCSI protocol operation request are three different fields.

In a second implementation of the sixth aspect, the second transceiver unit is further configured to receive an Ethernet response packet for the Ethernet operation request packet that is sent by the disk enclosure, where the Ethernet response packet for the Ethernet operation request packet carries the MAC address of the back-end adapter, the encapsulating and decapsulating unit is further configured to decapsulate the Ethernet response packet for the Ethernet operation request packet, to obtain a SCSI protocol operation request response, and the first transceiver unit is further configured to send the SCSI protocol operation request response to the central processing unit.

According to a seventh aspect, an embodiment of the present invention provides a back-end adapter, where the back-end adapter is applied to a controller of a storage system, and the storage system includes the controller and a disk enclosure. The controller communicates with the disk enclosure using an Ethernet network. The controller includes a central processing unit and the back-end adapter. The disk enclosure and the back-end adapter each have a media access control MAC address. Multiple disks are connected in the disk enclosure, and each disk in the disk enclosure is connected to the disk enclosure using the Serial Attached Small Computer System Interface SAS protocol. The back-end adapter stores a correspondence between the MAC address of the disk enclosure and a SAS protocol address of each disk in the disk enclosure. The back-end adapter includes a first interface, a second interface, a memory, and a first central processing unit, where the first interface is configured to receive a Small Computer System Interface SCSI protocol operation request sent by the central processing unit, where the SCSI protocol operation request carries a SAS protocol address of a target disk. The first central processing unit executes a computer instruction in the memory, querying a correspondence between the MAC address of the disk enclosure and the SAS protocol address of the target disk according to the SAS protocol address of the target disk to obtain the MAC address of the disk enclosure, and encapsulating the SCSI protocol operation request into an Ethernet operation request packet, where the Ethernet operation request packet carries the MAC address of the back-end adapter and the MAC address of the disk enclosure. The second interface is configured to send the Ethernet operation request packet to the disk enclosure according to the MAC address of the disk enclosure.

In a first implementation of the seventh aspect, the SCSI protocol operation request further carries a SCSI protocol transaction identifier of the controller. The first central processing unit executes the computer instruction in the memory, encapsulating the SCSI protocol transaction identifier of the controller into a first field of the Ethernet operation request packet, and encapsulating the SAS protocol address of the target disk into a second field, where the first field, the second field, and a field that is in the Ethernet operation request packet and carries the SCSI protocol operation request are three different fields.

In a second implementation of the seventh aspect, the second interface is further configured to receive an Ethernet response packet for the Ethernet operation request packet that is sent by the disk enclosure, where the Ethernet response packet for the Ethernet operation request packet carries the MAC address of the back-end adapter. The first central processing unit executes the computer instruction in the memory, decapsulating the Ethernet response packet for the Ethernet operation request packet to obtain a SCSI protocol operation request response, and the first interface is further configured to send the SCSI protocol operation request response to the central processing unit.

According to an eighth aspect, an embodiment of the present invention provides a disk enclosure, where the disk enclosure is applied to a storage system. The storage system includes a controller and the disk enclosure. The controller communicates with the disk enclosure using an Ethernet network. The controller includes a central processing unit and a back-end adapter. The disk enclosure and the back-end adapter each have a media access control MAC address. Multiple disks are connected in the disk enclosure, and each disk in the disk enclosure is connected to the disk enclosure using the Serial Attached Small Computer System Interface SAS protocol. The disk enclosure includes a front-end interface, a back-end interface, a first central processing unit, and a first memory. The front-end interface is configured to receive and decapsulate an Ethernet operation request packet sent by the controller, to obtain a Small Computer System Interface SCSI protocol operation request, and send the SCSI protocol operation request to the first central processing unit. The Ethernet operation request packet carries the MAC address of the back-end adapter and the MAC address of the disk enclosure. The SCSI protocol operation request carries a SCSI protocol transaction identifier of the controller and a SAS protocol address of a target disk. The first central processing unit executes a computer instruction in the first memory, receiving the SCSI protocol operation request, and sending the SCSI protocol operation request to the back-end interface. The back-end interface is configured to receive the SCSI protocol operation request, and send the SCSI protocol operation request to the target disk according to the SAS protocol address of the target disk.

In a first implementation of the eighth aspect, the first central processing unit executes the computer instruction in the first memory, establishing a correspondence between the MAC address of the back-end adapter and the SCSI protocol transaction identifier of the controller. The back-end interface is configured to send the SCSI protocol operation request to the target disk according to the SAS protocol address of the target disk. The back-end interface is further configured to receive a SCSI protocol operation request response that is sent by the target disk according to the SCSI protocol operation request, where the SCSI protocol operation request response carries the SCSI protocol transaction identifier of the controller. The first central processing unit executes the computer instruction in the first memory, querying the correspondence between the MAC address of the back-end adapter and the SCSI protocol transaction identifier of the controller according to the SCSI protocol transaction identifier of the controller carried in the SCSI protocol operation request response, to obtain the MAC address of the back-end adapter. The front-end interface is further configured to: receive the SCSI protocol operation request response sent by the first central processing unit, encapsulate the SCSI protocol operation request response into an Ethernet operation request response packet according to the MAC address of the back-end adapter that is obtained by the first central processing unit, and send the Ethernet operation request response packet to the controller according to the MAC address of the back-end adapter. The Ethernet operation request response packet carries the MAC address of the back-end adapter.

In a second implementation of the eighth aspect, a first field of the Ethernet operation request packet carries the SCSI protocol transaction identifier of the controller, and a second field of the Ethernet operation request packet carries the SAS protocol address of the target disk, where the first field, the second field, and a field that is in the Ethernet operation request packet and carries the SCSI protocol operation request are three different fields. Establishing a correspondence between the MAC address of the back-end adapter and the SCSI protocol transaction identifier of the controller includes decapsulating, by the front-end interface, the first field of the Ethernet operation request packet, to obtain the SCSI protocol transaction identifier of the controller, and establishing, by an establishing unit of the first central processing unit, the correspondence between the MAC address of the back-end adapter and the SCSI protocol transaction identifier of the controller. The back-end interface sending the SCSI protocol operation request to the target disk according to the SAS protocol address of the target disk includes the front-end interface decapsulating the second field of the Ethernet operation request packet, to obtain the SAS protocol address of the target disk, and the back-end interface sending the SCSI protocol operation request to the target disk according to the SAS protocol address of the target disk.

According to the storage system, method, and apparatus for processing an operation request provided by the embodiments of the present invention, a controller directly encapsulates a SCSI protocol operation request into an Ethernet operation request packet at the MAC layer instead of using the TCP/IP protocol layer. A disk enclosure decapsulates the Ethernet operation request to obtain the SCSI protocol operation request and sends the SCSI protocol operation request to a target disk, thereby reducing layers of encapsulation, reducing a processing delay of the storage system, and improving performance of the storage system.

BRIEF DESCRIPTION OF DRAWINGS

To describe the technical solutions in the embodiments of the present invention more clearly, the following briefly introduces the accompanying drawings required for describing the embodiments.

FIG. 4 is a table of correspondence between a SCSI protocol transaction identifier of a controller and a MAC address of a back-end adapter.

DESCRIPTION OF EMBODIMENTS

The following clearly describes the technical solutions in the embodiments of the present invention with reference to the accompanying drawings. The described embodiments are merely some but not all of the embodiments of the present invention.

Figure 1:
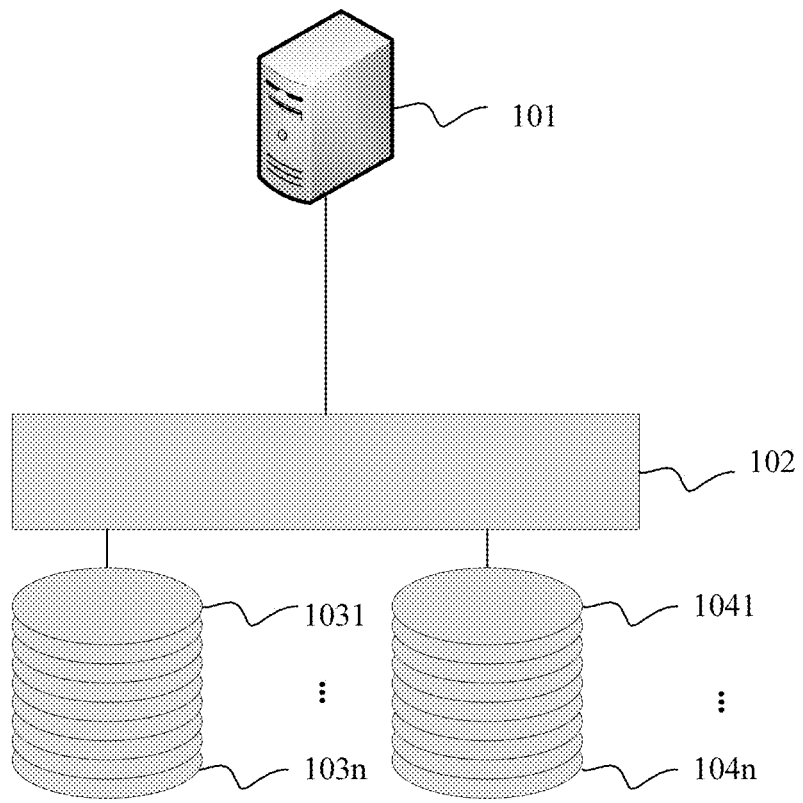
FIG. 1 is a diagram of a storage system embodiment.

As shown in FIG. 1, a storage system provided by an embodiment of the present invention includes a controller 101 and a disk enclosure 102, where multiple disks 1031 ... 103n, 1041 ... 104n are connected in the disk enclosure 102, and n is defined according to requirements of the storage system. In terms of the expression "multiple disks 1031 ... 103n, 1041 ... 104n are connected in the disk enclosure 102", another expression is: multiple disks 1031 ... 103n, 1041 ... 104n are disposed in the disk enclosure 102, and the disks 1031 ... 103n, 1041 ... 104n are communicatively connected to the disk enclosure 102. The controller 101 communicates with the disk enclosure 102 using an Ethernet network, and the disks 1031 ... 103n, 1041 ... 104n are connected to the disk enclosure 102 using a Serial Attached Small Computer System Interface (SAS). For detailed descriptions of the SAS protocol, refer to the SAS Protocol Layer-2 (SPL-2) standard (http://www.t10.org/members/w_spl2.htm). The disks 1031 ... 103n, 1041 ... 104n may be magnetic disks, optical disks or optical storage media, solid-state storage, other storage media, or combinations of the foregoing storage media, which is not limited by this embodiment of the present invention.

Figure 2:
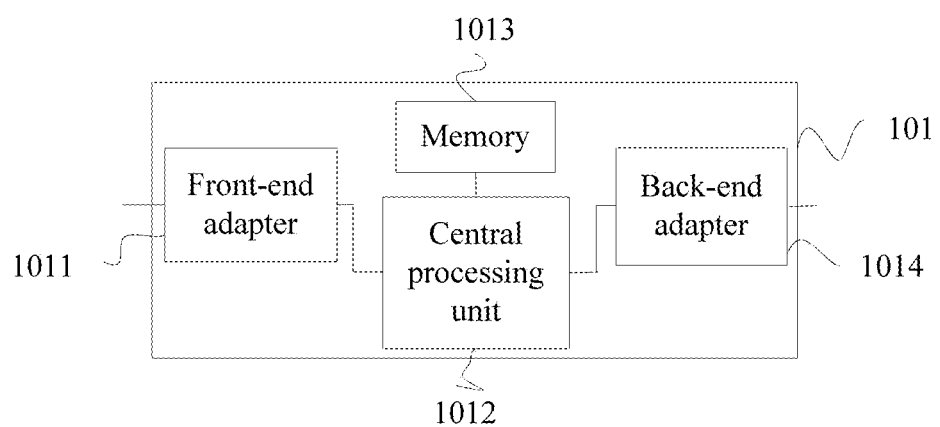
FIG. 2 is a diagram of a controller embodiment.

As shown in FIG. 2, an exemplary structure of the controller 101 includes a front-end adapter 1011, a central processing unit 1012, a memory 1013, and a back-end adapter 1014. The front-end adapter 1011 communicates with a server, and is configured to receive a read request sent by the server and return data to the server according to the read request, or is configured to receive a write request sent by the server and send a response to the server according to the write request. The central processing unit 1012 is configured to process, according to a computer instruction in the memory 1013, a read request and a write request that are received by the front-end adapter, or is configured to send an operation request to a disk in the disk enclosure 102 or receive an operation request response sent by the disk enclosure 102. The back-end adapter 1014 is configured to communicate with the disk enclosure 102 using an Ethernet network.

Figure 3A:
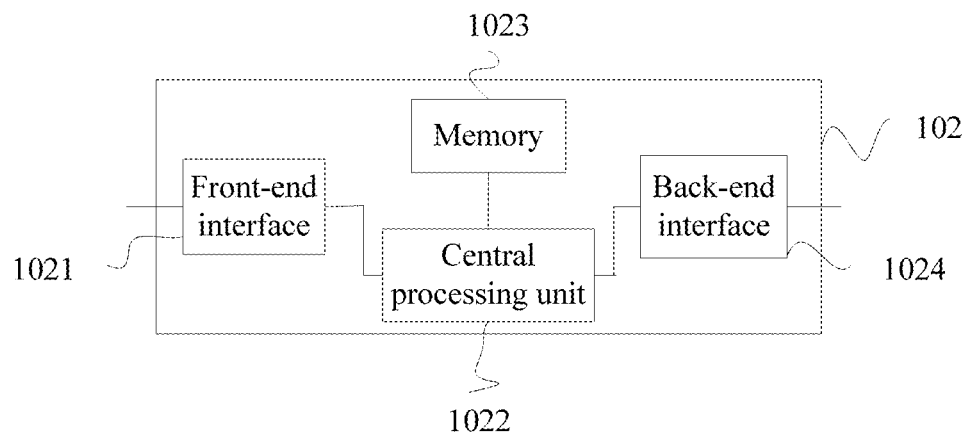
FIG. 3a and FIG. 3b are diagrams of a disk enclosure embodiment.

As shown in FIG. 3*a*, the disk enclosure 102 includes a front-end interface 1021, a central processing unit 1022, a memory 1023, and a back-end interface 1024. The disk enclosure 102 communicates with the controller 101 using the front-end interface 1021. The back-end interface 1024 is configured to communicate with disks 1031 . . . 103*n*, 1041 . . . 104*n*. The central processing unit 1022 is configured to process a read operation request or a write operation request that is from the controller 101 and based on a first protocol, send, according to the read operation request or write operation request, a read operation request or a write operation request that is based on a second protocol to a target disk among the disks 1031 . . . 103*n*, 1041 . . . 104*n*; and send, according to a read operation request response or a write operation request response that is sent by the target disk and based on the second protocol, a read operation request response or a write operation request response that is based on the first protocol to the controller 101. The first protocol and the second protocol may be different protocols and are specifically determined by an application scenario. In one embodiment, the first protocol is an Ethernet communications protocol, and the second protocol is the SAS protocol. The back-end interface 1024 of the disk enclosure 102 communicates with SAS protocol interfaces of the disks 1031 . . . 103*n*, 1041 . . . 104*n* using the SCSI protocol and a SAS protocol interface. Specifically, the front-end interface 1021 of the disk enclosure 102 is configured to receive and decapsulate an Ethernet operation request packet sent by the controller 101, obtain a SCSI protocol operation request, and send the SCSI protocol operation request to the central processing unit 1022. The Ethernet operation request packet carries a MAC address of the back-end adapter 1014 and a MAC address of the disk enclosure 102. The SCSI protocol operation request carries a SCSI protocol transaction identifier of the controller 101 and a SAS protocol address of a target disk 1031, where the SCSI protocol transaction identifier is used to uniquely identify a specific SCSI protocol transaction link established between the controller 101 and the target disk 1031. The target disk 1031 refers to a disk accessed by the SCSI protocol operation request.

The processing unit 1022 executes a computer instruction in the memory 1023, to implement the following operations: receiving the SCSI protocol operation request, establishing a correspondence between the MAC address of the back-end adapter 1014 and the SCSI protocol transaction identifier of the controller 101, and sending the SCSI protocol operation request to the back-end interface 1024 according to the SAS protocol address of the target disk 1031. According to the SAS protocol address of the target disk 1031, an implementation manner comprises parsing the SCSI protocol operation request to obtain the SAS protocol address of the target disk 1031.

The back-end interface 1024 is configured to receive the SCSI protocol operation request and send the SCSI protocol operation request to the target disk 1031. The back-end interface 1024 is further configured to receive a SCSI protocol operation request response that is sent by the target disk 1031 according to the SCSI protocol operation request, where the SCSI protocol operation request response carries the SCSI protocol transaction identifier of the controller 101.

Correspondingly, the central processing unit 1022 executes the computer instruction in the memory 1023, and further implements the following operation: querying the correspondence between the MAC address of the back-end adapter 1014 and the SCSI protocol transaction identifier of the controller 101 according to the SCSI protocol transaction identifier of the controller 101 carried in the SCSI protocol operation request response, to obtain the MAC address of the back-end adapter 1014; and the front-end interface 1201 is further configured to: receive the SCSI protocol operation request response sent by the central processing unit 1022; encapsulate, according to the MAC address of the back-end adapter 1014 obtained by the central processing unit 1022, the SCSI protocol operation request response into an Ethernet operation request response packet that carries the MAC address of the back-end adapter 1014; and send the Ethernet operation request response packet to the controller 101 according to the MAC address of the back-end adapter 1014.

In another implementation, the back-end adapter 1014 encapsulates the SCSI protocol operation request into the Ethernet operation request packet, encapsulates the SCSI protocol transaction identifier of the controller 101 carried in the SCSI protocol operation request into a first field of the Ethernet operation request packet, encapsulates the SAS protocol address of the target disk 1031 into a second field, and sends the Ethernet operation request packet to the disk enclosure 102, where the first field, the second field, and a field carrying the SCSI protocol operation request are three different fields. The disk enclosure 102 decapsulates the Ethernet operation request packet, obtains the SAS protocol address of the target disk from the foregoing second field, instead of parsing the field carrying the SCSI protocol operation request to obtain the SCSI protocol transaction identifier of the controller 101 and the SAS protocol address of the target disk from the SCSI protocol operation request, and sends the SCSI protocol operation request to the target disk according to the SAS protocol address of the target disk. The disk enclosure 102 obtains the SCSI protocol transaction identifier of the controller 101 from the foregoing first field, and establishes the correspondence between the SCSI protocol transaction identifier of the controller 101 and the MAC address of the back-end adapter 1014 according to the SCSI protocol transaction identifier of the controller 101 obtained from the foregoing first field. In this implementation manner, after decapsulating the Ethernet operation request packet, the disk enclosure 102 can establish the correspondence between the SCSI protocol transaction identifier of the controller 101 and the MAC of the back-end adapter 101, and send the SCSI protocol operation request to the target disk, without a need to parse the SCSI protocol operation request, thereby saving computation resources of the disk enclosure 102.

Exemplarily, the central processing unit 1022 of the disk enclosure 102 establishes the correspondence between the SCSI protocol transaction identifier of the controller 101 and the MAC address of the back-end adapter 1014. As shown in FIG. 4, the correspondence between the SCSI protocol transaction identifier of the controller 101 and the MAC address of the back-end adapter 1014 is stored in a form of a two-dimensional table. In specific computer implementation, the two-dimensional table may be stored in a form of a two-dimensional array or in a form that can be recognized by a computer, which is not limited by this embodiment of the present invention. Packet formats of the SCSI protocol operation request response packet and the Ethernet operation request response packet respectively correspond to those of the SCSI protocol operation request and the Ethernet operation request. A specific difference lies in different content carried in packet fields. When in the Ethernet operation request packet, the first field is used to carry the SCSI protocol transaction identifier of the controller, and the second field is used to carry the destination SAS protocol address, in the Ethernet operation request response packet, a first field still carries the SCSI protocol transaction identifier of the controller, and the destination SAS protocol address in a second field is empty.

The disk enclosure 102 described in FIG. 3a of the embodiment of the present invention may be implemented by a computer having a general central processing unit, as shown in FIG. 3a. In another aspect, the disk enclosure 102 may be implemented jointly by an application-specific integrated circuit (ASIC), namely an ASIC commercial chip, and a memory, or may be implemented by a Field Programmable Gate Array (FPGA). In terms of logical division, the disk enclosure 102 includes a processing function, namely a central processing unit, and a memory in which a processing instruction is stored.

Figure 3B:
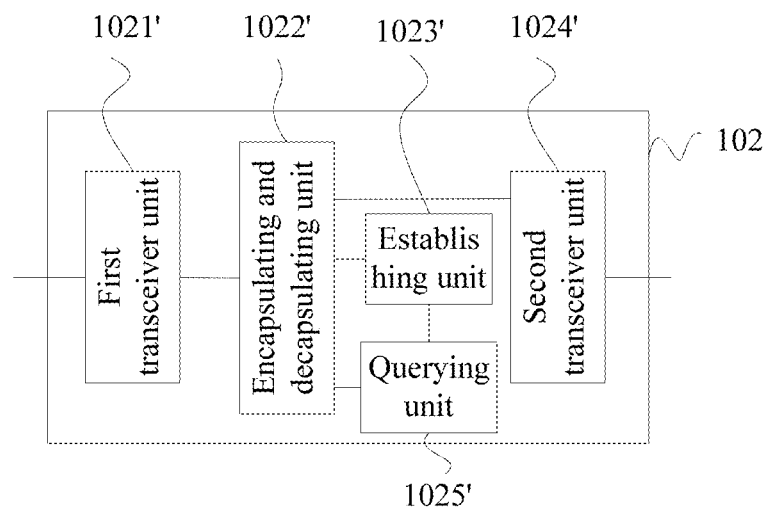

As shown in FIG. 3b, another logical presentation of a structure of the disk enclosure 102 based on the structure of the disk enclosure 102 shown in FIG. 3a includes a first transceiver unit 1021', an encapsulating and decapsulating unit 1022', and a second transceiver unit 1024'.

The first transceiver unit 1021' is configured to receive an Ethernet operation request packet sent by the controller 101, where the Ethernet operation request packet carries a MAC address of the back-end adapter 1014 and a MAC address of the disk enclosure 102.

The encapsulating and decapsulating unit 1022' is configured to decapsulate the Ethernet operation request packet received by the first transceiver unit 1021', and obtain a SCSI protocol operation request, where the SCSI protocol operation request carries a SCSI protocol transaction identifier of the controller 101 and a SAS protocol address of a target disk 1031.

The second transceiver unit 1024' is configured to send the SCSI protocol operation request to the target disk 1031 according to the SAS protocol address of the target disk 1031. Further, the disk enclosure 102 further includes an establishing unit 1023' and a querying unit 1025'. The establishing unit 1023' is configured to establish a correspondence between the MAC address of the back-end adapter 1014 and the SCSI protocol transaction identifier of the controller 101. Further, the second transceiver unit 1024' is further configured to receive a SCSI protocol operation request response that is sent by the target disk 1031 according to the SCSI protocol operation request, where the SCSI protocol operation request response carries the SCSI protocol transaction identifier of the controller 101. The querying unit 1025' is configured to query, according to the SCSI protocol transaction identifier of the controller 101, the correspondence between the MAC address of the back-end adapter 1014 and the SCSI protocol transaction identifier of the controller 101 that is established by the establishing unit 1023', to obtain the MAC address of the back-end adapter 1014. The encapsulating and decapsulating unit 1022' is further configured to encapsulate the SCSI protocol operation request response into an Ethernet operation request response packet, where the Ethernet operation request response packet carries the MAC address of the back-end adapter 1014. The first transceiver unit 1021' is further configured to send the Ethernet operation request response packet to the controller 101 according to the MAC address of the back-end adapter 1014. In one implementation manner, a first field of the Ethernet operation request packet carries the SCSI protocol transaction identifier of the controller 101, and a second field of the Ethernet operation request packet carries the SAS protocol address of the target disk 1031, where the first field, the second field, and a field that is in the Ethernet operation request packet and carries the SCSI protocol operation request are three different fields. That the establishing unit 1023' establishes a correspondence between the MAC address of the back-end adapter 1014 and the SCSI protocol transaction identifier of the controller 101 includes: the encapsulating and decapsulating unit 1022' decapsulates the first field of the Ethernet operation request packet to obtain the SCSI protocol transaction identifier of the controller 101, and the establishing unit 1023' establishes the correspondence between the MAC address of the back-end adapter 1014 and the SCSI protocol transaction identifier of the controller 101. That the second transceiver unit 1024' sends the SCSI protocol operation request to the target disk 1031 according to the SAS protocol address of the target disk 1031 includes: the encapsulating and decapsulating unit 1022' decapsulates the second field of the Ethernet operation request packet, to obtain the SAS protocol address of the target disk 1031, and the second transceiver unit 1024' sends the SCSI protocol operation request to the target disk 1031 according to the SAS protocol address of the target disk 1031.

In another embodiment based on FIG. 3b, the first field of the Ethernet operation request packet sent by the back-end adapter 1014 carries the SCSI protocol transaction identifier of the controller 101, and the second field carries the SAS protocol address of the target disk 1031, where in the Ethernet operation request packet, the first field, the second field, and a field carrying the SCSI protocol operation request are three different fields; and the establishing unit 1023' establishes the correspondence between the MAC address of the back-end adapter 1014 and the SCSI protocol transaction identifier of the controller 101, where the SCSI protocol transaction identifier of the controller 101 is obtained by the disk enclosure 102 from the first field by decapsulating the Ethernet operation request packet.

That the second transceiver unit 1024' sends the SAS protocol address of the target disk in the SCSI protocol operation request to the target disk according to the SAS protocol address of the target disk includes: the encapsulating and decapsulating unit 1022' decapsulates the Ethernet operation request packet, to obtain the SAS protocol address of the target disk from the second field, and the second transceiver unit 1024' sends the SCSI protocol operation request to the target disk according to the SAS protocol address of the target disk obtained from the second field. In this way, without a need to parse the SCSI protocol operation request, the correspondence between the SCSI protocol transaction identifier of the controller 101 and the MAC address of the back-end adapter 1014 can be established according to the SCSI protocol transaction identifier of the controller 101 carried in the first field, and the SCSI protocol operation request can be directly sent to the target disk 1031 according to the SAS protocol address of the target disk 1031 carried in the second field.

Figure 5A:
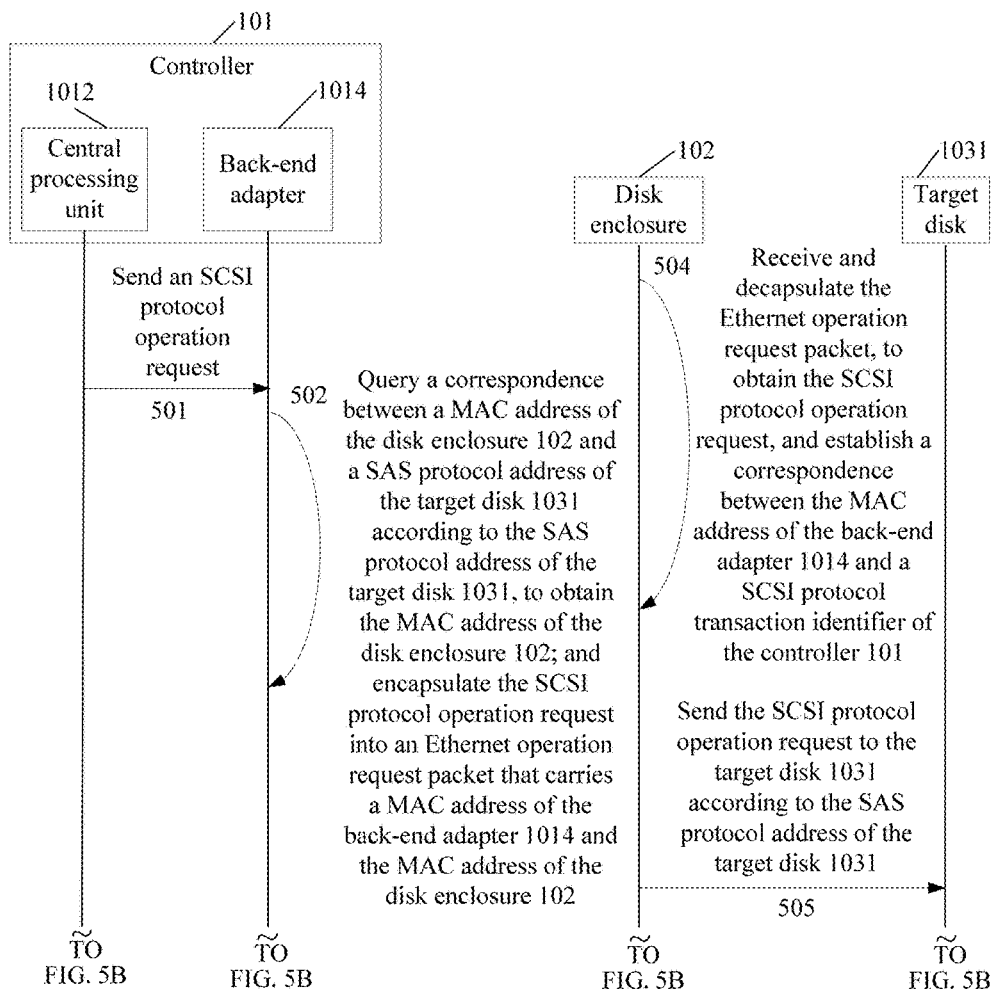
FIG. 5A and FIG. 5B are flowcharts of communication among a controller, a disk enclosure, and a target disk according to an embodiment.
Figure 5B:
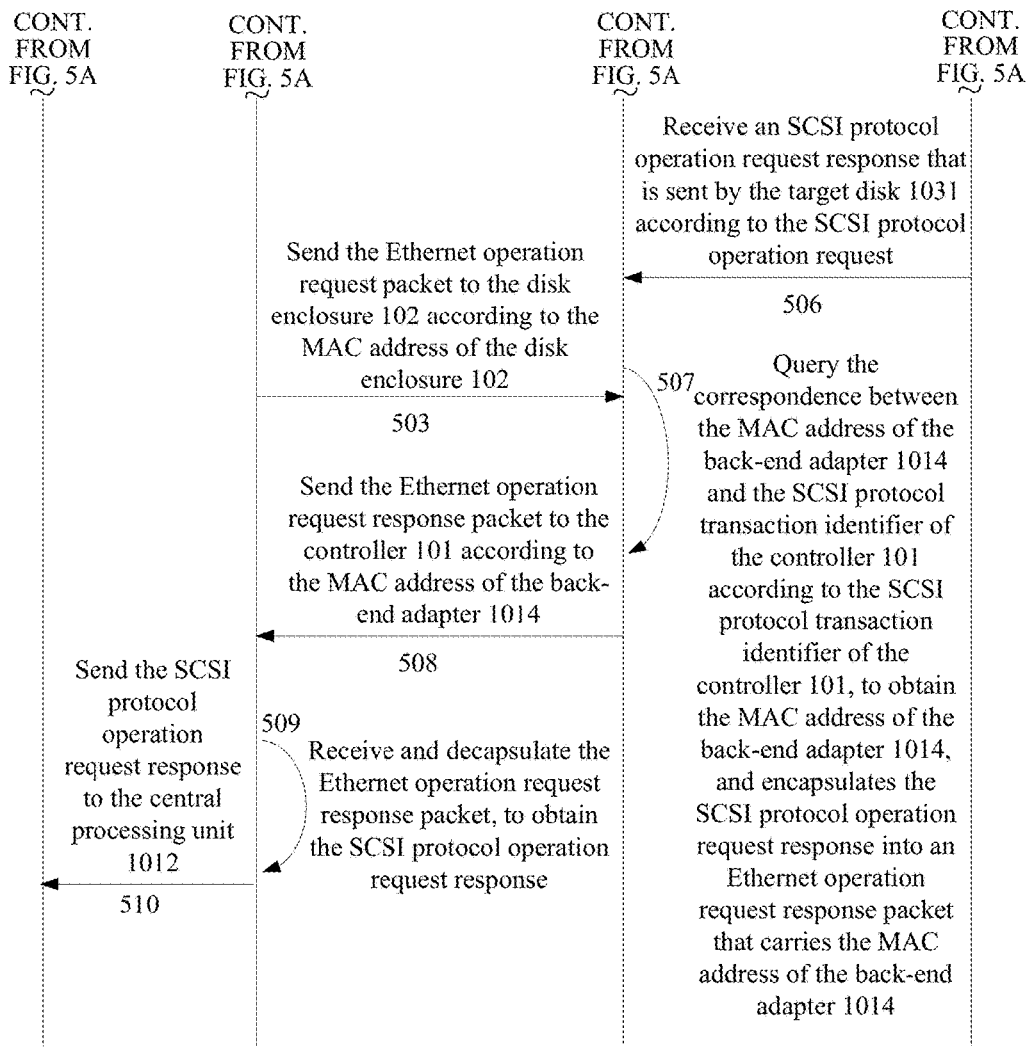

An embodiment of the present invention provides a method that can be implemented based on the structure shown in FIG. 2. As shown in FIG. 5A and FIG. 5B, a detailed procedure of the method includes the following steps:

501: A central processing unit 1012 sends a SCSI protocol operation request to a back-end adapter 1014.

502: After receiving the SCSI protocol operation request, the back-end adapter 1014 queries a correspondence between a MAC address of a disk enclosure 102 and a SAS protocol address of a target disk 1031 to obtain the MAC address of the disk enclosure 102, and encapsulates the SCSI protocol operation request as an Ethernet operation request packet, where the Ethernet operation request packet carries a MAC address of the back-end adapter 1014 and the MAC address of the disk enclosure 102.

503: The back-end adapter 1014 sends the Ethernet operation request packet to the disk enclosure 102 according to the MAC address of the disk enclosure 102.

504: The disk enclosure 102 receives and decapsulates the Ethernet operation request packet, to obtain the SCSI protocol operation request, and establishes a correspondence between the MAC address of the back-end adapter 1014 and a SCSI protocol transaction identifier of the controller 101.

505: The disk enclosure 102 sends the SCSI protocol operation request to the target disk 1031 according to the SAS protocol address of the target disk 1031.

After receiving the SCSI protocol operation request, the target disk 1031 generates a SCSI protocol operation request response.

506: The disk enclosure 102 receives the SCSI protocol operation request response that is sent by the target disk 1031 according to the SCSI protocol operation request.

507: The disk enclosure 102 queries the correspondence between the MAC address of the back-end adapter 1014 and the SCSI protocol transaction identifier of the controller 101 according to the SCSI protocol transaction identifier of the controller 101 to obtain the MAC address of the back-end adapter 1014, and encapsulates the SCSI protocol operation request response into an Ethernet operation request response packet that carries the MAC address of the back-end adapter 1014.

508: The disk enclosure 102 sends the Ethernet operation request response packet to the controller 101 according to the MAC address of the back-end adapter 1014.

509: The back-end adapter 1014 receives and decapsulates the Ethernet operation request response packet, to obtain the SCSI protocol operation request response.

510: The back-end adapter 1014 sends the SCSI protocol operation request response to the central processing unit 1012.

In this embodiment, the back-end adapter 1014 of the controller 101 has a MAC address, and the disk enclosure 102 also has a MAC address. When the controller 101 communicates with the disk enclosure 102 using an Ethernet network, a SCSI protocol command is encapsulated into an Ethernet packet, and central processing units of the controller 101 and the disk enclosure 102 do not use the TCP/IP protocol for encapsulation or decapsulation, thereby reducing layers of encapsulation or decapsulation, reducing resource consumption of a central processing unit of a storage system, reducing a processing delay of the storage system, and improving performance of the storage system.

In a scenario of this embodiment of the present invention, to implement that the controller 101 accesses any one of disks 1031 . . . 103n, 1041 . . . 104n, a correspondence between the MAC address of the disk enclosure 102 and a SAS protocol address of each of the disks 1031 . . . 103n, 1041 . . . 104n needs to be established on the controller 101, and the disk enclosure 102 needs to store the correspondence between the SCSI protocol transaction identifier of the controller 101 and the MAC address of the back-end adapter 1014 in the controller 101. In this embodiment of the present invention, after the storage system is powered on, the back-end adapter 1024 of the controller 101 sends a heartbeat broadcast packet that carries the MAC address of the back-end adapter 1014 and the SCSI protocol transaction identifier of the controller 101. The heartbeat broadcast packet is used to collect the MAC address of the disk enclosure 102 and the SAS protocol address of each of the disks 1031 . . . 103n, 1041 . . . 104n that communicate with the disk enclosure 102 on one hand, and on the other hand update a state change of the disks that communicates with the disk enclosure 102, such as an increase or a decrease in the disks. The disk enclosure 102 collects the SAS protocol address of each of the disks 1031 . . . 103n, 1041 . . . 104n. After receiving the heartbeat broadcast packet, the disk enclosure 102 sends a heartbeat broadcast packet response to the back-end adapter 1014, where the heartbeat broadcast packet response carries the MAC address of the disk enclosure 102 and the SAS protocol address of each of the disks 1031 . . . 103n, 1041 . . . 104n. After receiving the heartbeat broadcast packet response sent by the disk enclosure 102, the back-end adapter 1014 of the controller 101 establishes and stores the correspondence between the MAC address of the disk enclosure 102 and the SAS protocol address of each of the disks 1031 . . . 103n, 1041 . . . 104n.

Figure 6:
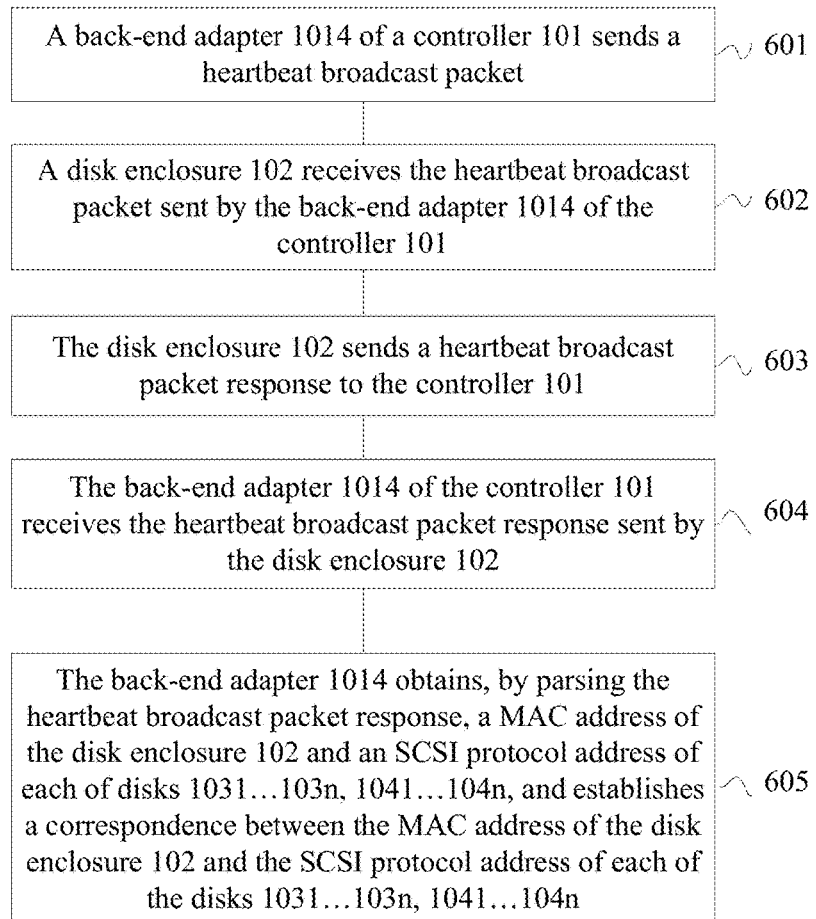
FIG. 6 is a flowchart of collection of a MAC address of a disk enclosure and a SAS protocol address of a disk that communicates with the disk enclosure by a controller using a heartbeat broadcast packet, according to an embodiment.

As shown in FIG. 6, an implementation manner includes:

Step 601: A back-end adapter 1014 of a controller 101 sends a heartbeat broadcast packet.

Step 602: A disk enclosure 102 receives the heartbeat broadcast packet sent by the back-end adapter 1014 of the controller 101.

Step 603: The disk enclosure 102 sends a heartbeat broadcast packet response to the controller 101.

Step 604: The back-end adapter 1014 of the controller 101 receives the heartbeat broadcast packet response sent by the disk enclosure 102.

Step 605: The back-end adapter 1014 obtains, by parsing the heartbeat broadcast packet response, a MAC address of the disk enclosure 102 and a SAS protocol address of each of disks 1031 . . . 103n, 1041 . . . 104n, and establishes a correspondence between the MAC address of the disk enclosure 102 and the SAS protocol address of each of the disks 1031 . . . 103n, 1041 . . . 104n.

Figure 7:
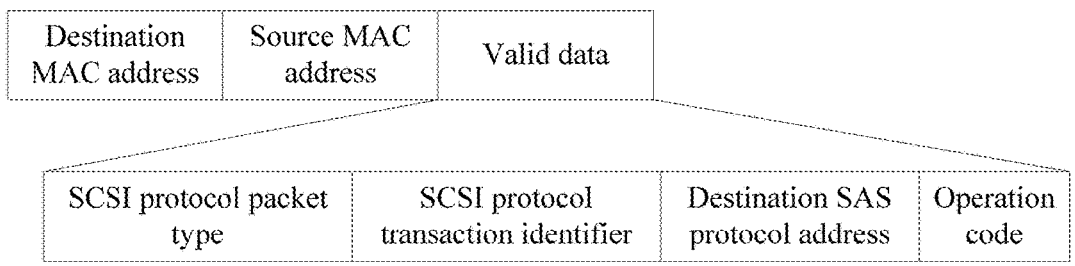
FIG. 7 is a diagram of a packet format of a heartbeat broadcast packet embodiment.

Exemplarily, a packet format of the heartbeat broadcast packet sent by the back-end adapter 1014 in step 601 is shown in FIG. 7. In the heartbeat broadcast packet sent by the back-end adapter 1014, a SCSI protocol packet is also directly encapsulated into an Ethernet packet instead of using the TCP/IP layer. As can be seen from FIG. 7, the heartbeat broadcast packet sent by the back-end adapter 1014 is used as an Ethernet packet and includes a destination MAC address field, a source MAC address field, and a payload. A source MAC address bit carries the MAC address of the back-end adapter 1014. When the heartbeat broadcast packet is used as a broadcast packet, each bit in the destination MAC address field is 1. The payload of the heartbeat broadcast packet carries another field. The payload may include multiple fields, for example, a SCSI protocol packet-type field that is used to indicate a type of a SCSI protocol operation request, such as a SCSI protocol read operation request or a SCSI protocol write operation request; a SCSI protocol transaction identifier field that is used to uniquely identify a specific SCSI protocol transaction link established between a controller and a disk; and a destination SAS protocol address field that is used to indicate receiving of a SAS protocol address of a disk that is encapsulated into the SCSI protocol operation request, where a SAS protocol address of a target disk receiving a current SCSI protocol operation request can be recognized by using the field, without a need to parse and query a SCSI protocol frame data field to determine the SAS protocol address of the target disk. In the heartbeat broadcast packet, each bit of the destination SAS address field is 0. The payload further includes an operation code field, where the operation code field is used to indicate an operation type of a SCSI command and a data field. In the heartbeat broadcast packet, the operation code field is 0x050, which is used to indicate a broadcast packet. FIG. 7 shows a packet format of a heartbeat broadcast packet. After receiving the heartbeat broadcast packet, the disk enclosure 102 decapsulates an Ethernet operation request packet, and determines, according to information carried in the destination SAS protocol address field, that the packet is a heartbeat broadcast packet, thereby improving a packet processing speed. In another implementation manner, a valid data field does not include the SCSI protocol transaction identifier field, the destination SAS protocol address field, or the SCSI protocol packet-type field. The payload of the heartbeat broadcast packet includes the SCSI protocol frame data field, where the SCSI protocol frame data field carries the SCSI protocol operation request, and the SCSI protocol transaction identifier of the controller 101 and the destination SAS protocol address that are carried in the heartbeat broadcast packet may be obtained from the SCSI protocol frame data field of the heartbeat broadcast packet. Although the heartbeat broadcast packet in an Ethernet operation request packet format shown in FIG. 7 includes the destination MAC address field, the source MAC address field, and the payload, for a person skilled in the art, the Ethernet operation request packet may further include another field as required, and the payload may further include another field as required, which are not described herein again.

Figures 8, 9:
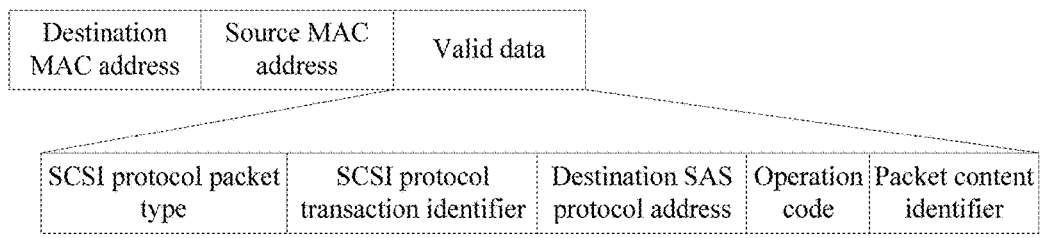
FIG. 8 is a diagram of a packet format of a heartbeat broadcast packet response embodiment.
FIG. 9 is a table of a correspondence between a MAC address of a disk enclosure and a SAS protocol address of a disk that communicates with the disk enclosure.

Exemplarily, as shown in FIG. 8, in a packet format of the heartbeat broadcast packet response sent by the disk enclosure 102 to the controller 101 in step 603, a destination MAC address field of the heartbeat broadcast packet response is the MAC address of the back-end adapter 1014, a source MAC address field carries the MAC address of the disk enclosure 102, an operation code field is 0x060, and a payload further includes a packet content identifier field that is used to carry a SAS protocol address of a disk that communicates with the disk enclosure 102.

Referring again to FIG. 6, in step 605, the back-end adapter 1014 obtains, by parsing the heartbeat broadcast packet response, the MAC address of the disk enclosure 102 and the SAS protocol address of each of the disks 1031 . . . 103n, 1041 . . . 104n. As shown in FIG. 9, the correspondence between the MAC address of the disk enclosure 102 and the SAS protocol address of each of the disks 1031 . . . 103n, 1041 . . . 104n is stored in the form of a two-dimensional table. In specific computer implementation, the two-dimensional table may be stored in the form of a two-dimensional array or in a form that can be recognized by a computer, which is not limited by this embodiment of the present invention. The disk enclosure 102 sends the heartbeat broadcast packet response to the controller 101. The heartbeat broadcast packet response may carry the MAC address of the disk enclosure 102 and the SAS protocol addresses of all the disks 1031 . . . 103n, 1041 . . . 104n, or the heartbeat broadcast packet response may carry the MAC address of the disk enclosure 102 and SAS protocol addresses of some of the disks, where the correspondence between the MAC address of the disk enclosure 102 and the SAS protocol address of each of the disks 1031 . . . 103n, 1041 . . . 104n that is stored by the back-end adapter 1014 is updated and improved by exchanging a heartbeat broadcast packet and a heartbeat broadcast packet response between the controller 101 and disk enclosure 102 for multiple times. When a new disk is connected in the disk enclosure 102, the disk enclosure 102 receives a heartbeat broadcast packet sent by the controller 101, and sends, to the controller 101, a heartbeat broadcast packet response that carries the MAC address of the disk enclosure 102 and a SAS protocol address of the new disk. In this embodiment of the present invention, another expression of saving the correspondence between the SCSI protocol transaction identifier of the controller 101 and the MAC address of the back-end adapter 1014 comprises storing the correspondence between the SCSI protocol transaction identifier of the controller 101 and the MAC address of the back-end adapter 1014. Another expression of saving the correspondence between the MAC address of the disk enclosure 102 and the SAS protocol address of each of the disks 1031 . . . 103n, 1041 . . . 104n comprises storing the correspondence between the MAC address of the disk enclosure 102 and the SAS protocol address of each of the disks 1031 . . . 103n, 1041 . . . 104n. Both expressions have a same meaning.

Figure 10:
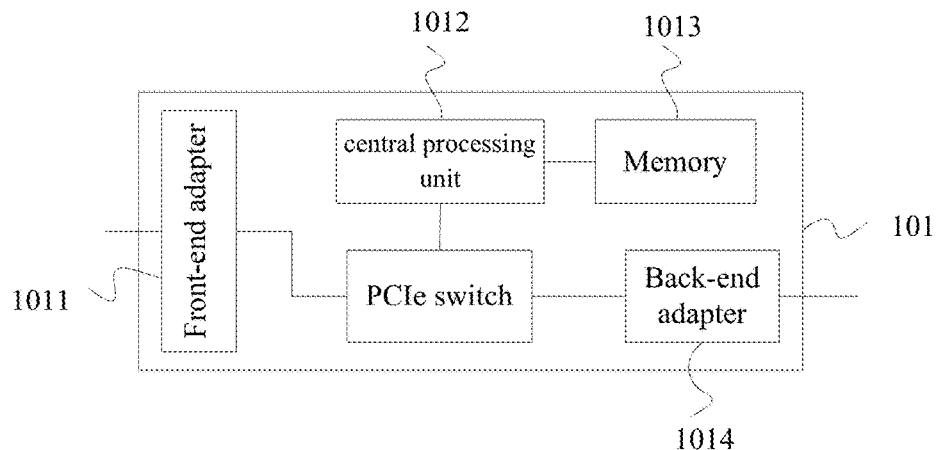
FIG. 10 is a diagram of a controller embodiment.

In this embodiment of the present invention, FIG. 10 shows a connection relationship between the central processing unit 1012 of the controller 101 and the back-end adapter 1014 of the controller 101 in the schematic structural diagram of the controller shown in FIG. 2. The front-end adapter 1011 and the back-end adapter 1014 communicate with the central processing unit 1012 through Peripheral Component Interconnect Express (PCIe) switching. Certainly, the front-end adapter 1011 and the back-end adapter 1014 are connected through PCIe switching. The implementation for communication with the central processing unit 1012 is only one implementation, and the communication may also be implemented by using a south bridge chip, which is not limited herein.

The controller structure shown in FIG. 10 is used as an example. The central processing unit 1012 of the controller 101 sends, to a target disk connected to the disk enclosure 102, a SCSI protocol operation request, such as a read operation request or a write operation request, which is not limited by the present invention. The SCSI protocol operation request may be sent to the target disk by the central processing unit 1012 according to an operation request that is received by the front-end adapter 1011 and sent by a server, which is not limited herein. Exemplarily, a packet format of the SCSI protocol operation request is a standard SCSI protocol packet format, and the SCSI protocol operation request carries a SCSI protocol transaction identifier of the controller 101 and a SAS protocol address of the target disk. The back-end adapter 1014 receives the SCSI protocol operation request, and queries a correspondence between a MAC address of the disk enclosure and the SAS protocol address of the target disk according to the SAS protocol address carried in the SCSI protocol operation request. For example, the back-end adapter 1014 queries a two-dimensional table representing a correspondence between the MAC address of the disk enclosure 102 and a SAS protocol address of each of disks 1031 . . . 103n, 1041 . . . 104n. In this embodiment of the present invention, that the SAS protocol address of the target disk carried in the SCSI protocol operation request is a SAS protocol address of a disk 1031 is used as an example. A correspondence between the disk enclosure 102 and the SAS protocol address of the target disk 1031 is queried according to the SAS protocol address of the target disk 1031, to obtain the MAC address of the disk enclosure 102.

Figure 11:
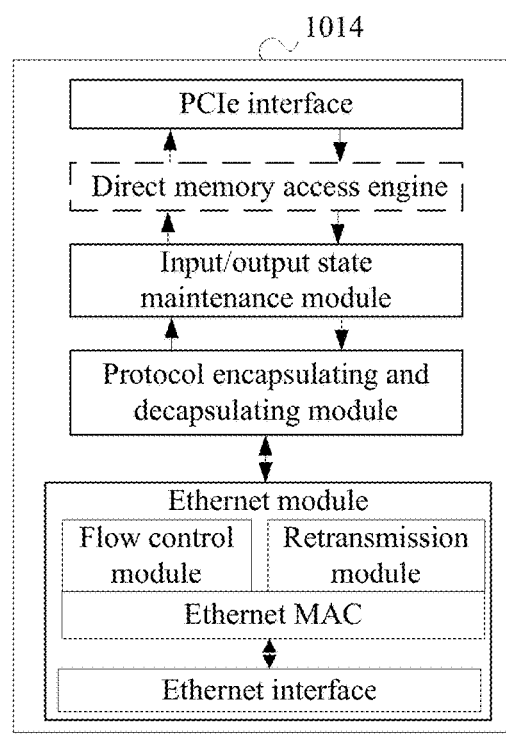
FIG. 11 is a diagram of a back-end adapter embodiment.

Exemplarily, as shown in FIG. 11, a structure of the back-end adapter 1014 includes a PCIe interface, a Direct Memory Access (DMA) engine, an input/output state maintenance module, a protocol encapsulating and decapsulating module, and an Ethernet module. The PCIe interface is used to implement data transmission with a PCIe interface of the central processing unit 1012, for example, receiving a SCSI protocol operation request sent by the central processing unit 1012. The DMA engine is an optional structure in the back-end adapter 1014, and may directly read data from a memory 1013 of the controller or directly write data into the memory 1013 of the controller according to a SCSI protocol packet type and a memory address carried in the SCSI protocol operation request. The input/output state maintenance module is used to collect and maintain a correspondence between the MAC address of the disk enclosure and a SAS protocol address of a disk, for example, storing a two-dimensional table used to represent a correspondence between the MAC address of the disk enclosure 102 and a SAS protocol address of each of disks 1031 . . . 103n, 1041 . . . 104n. The input/output state maintenance module is used to query, according to a SAS protocol address of a target disk carried in the SCSI protocol operation request received through the PCIe interface, a MAC address of a disk enclosure in which the target disk is located, where the disk enclosure in which the target disk is located refers to a disk enclosure in which the target disk is placed. For meaning of placing, refer to the foregoing description. In this embodiment of the present invention, the SAS protocol address of the target disk carried in the SCSI protocol operation request is a SAS protocol address of a disk 1031, and a queried MAC address of a disk enclosure corresponding to the SAS protocol address of the target disk 1031 is the MAC address of the disk enclosure 102. The SCSI protocol operation request and the MAC address of the disk enclosure 102 are sent to the protocol encapsulating and decapsulating module. As shown in FIG. 11, the protocol encapsulating and decapsulating module encapsulates the SCSI protocol operation request into a SCSI protocol frame data field, the SAS protocol address of the target disk 1031 is encapsulated into a destination SAS protocol address field, a SCSI protocol operation request type is encapsulated into a SCSI protocol packet-type field, a SCSI protocol transaction identifier of the controller 101 is encapsulated into a SCSI protocol transaction identifier field, and the SCSI protocol packet-type field, the SCSI protocol transaction identifier field, the destination SAS protocol address field, and the SCSI protocol frame data field are encapsulated into a payload of an Ethernet operation request packet, where in the Ethernet operation request packet, a destination MAC address field carries the MAC address of the disk enclosure 102, and a source MAC address field carries a MAC address of the back-end adapter 1014. In the payload of the Ethernet operation request packet, the destination SAS protocol address field, the SCSI protocol transaction identifier field, and the SCSI protocol frame data field carrying the SCSI protocol operation request are three different fields. In another implementation manner, the payload of the Ethernet operation request packet does not include the SCSI protocol transaction identifier field or the destination SAS protocol address field, and the disk enclosure 102 obtains the SAS address of the target disk 1031 and the SCSI protocol transaction identifier of the controller 101 from the SCSI protocol operation request carried in the SCSI protocol frame data field. The Ethernet module sends the Ethernet operation request packet to the disk enclosure 102 by using an Ethernet network. The Ethernet module includes a flow control module, a packet retransmission module, an Ethernet MAC module, and an Ethernet interface. The flow control module is configured to perform flow control processing when data congestion occurs on the Ethernet network, to avoid data packet loss caused by Ethernet congestion; the packet retransmission module is configured to retransmit a packet when a packet transmission error occurs on the Ethernet network, to ensure reliability of data transmission; and the Ethernet MAC module and the Ethernet interface, serving as an Ethernet MAC layer and an Ethernet physical interface layer, have a same meaning as an Ethernet MAC layer and an Ethernet physical interface layer in a standard Ethernet network structure.

The input/output state maintenance module is further configured to create and maintain an input and output state according to the SCSI protocol packet-type field of the SCSI protocol operation request during a process of executing the SCSI protocol operation request. Exemplarily, an input and output state table may be used to record a transaction execution state of the SCSI protocol operation request, to avoid a SCSI protocol operation request conflict. In this embodiment of the present invention, when the Ethernet operation request packet is sent to the disk enclosure 102, the transaction execution state of the SCSI protocol operation request is recorded as establishing a link with a SCSI protocol transaction of the target disk 1031 and executing the SCSI protocol transaction.

The front-end interface 1021 of the disk enclosure 102 shown in FIG. 3a receives an Ethernet operation request packet that is sent by the back-end adapter 1014 and carries the MAC address of the disk enclosure 102 and the MAC address of the back-end adapter 1014, and decapsulates the Ethernet operation request packet. A type of a SCSI protocol operation request can be obtained according to a SCSI protocol packet-type field in a payload. For example, a type of the SCSI protocol packet type is a SCSI protocol read operation request. A SCSI protocol transaction identifier can be obtained according to the SCSI protocol transaction identifier field in the payload, to establish a correspondence between the SCSI protocol transaction identifier and the MAC address of the back-end adapter 1014, and the SAS protocol address of the target disk 1031 can be obtained according to the destination SAS protocol address field in the payload. The disk enclosure 102 may send the SCSI protocol operation request to the target disk 1031 according to the SAS protocol address of the target disk 1031, without a need to parse the SCSI protocol frame data field. Therefore, computation resources used by the disk enclosure 102 to perform protocol processing are reduced, a protocol processing speed is improved, and performance of a storage system is improved. In another implementation manner, if the payload of the Ethernet operation request packet does not have the SCSI protocol transaction identifier field and the destination SAS protocol address field, after decapsulating the Ethernet operation request packet, the disk enclosure obtains the SCSI protocol operation request from the payload, parses the SCSI protocol operation request to obtain the SCSI protocol transaction identifier and the SAS protocol address of the target disk, establishes the correspondence between the SCSI protocol transaction identifier and the MAC address of the back-end adapter 1014, and sends the SCSI protocol operation request to the target disk 1031 according to the SAS protocol address of the target disk 1031 through the back-end interface 1024.

After the Ethernet operation request packet carrying the SCSI protocol operation request is decapsulated, the MAC address of the back-end adapter 1014 is obtained. The SCSI protocol transaction identifier is obtained according to the SCSI protocol transaction identifier field in the payload. The central processing unit 1022 establishes the correspondence between the MAC address of the back-end adapter 1014 and the SCSI protocol transaction identifier of the controller 101. The back-end interface 1024 sends the SCSI protocol operation request to the target disk 1031 according to the SAS protocol address of the target disk 1031 carried in the destination SAS protocol address field in the payload. The central processing unit 1022 receives, through the back-end interface 1024, a SCSI protocol operation request response sent by the target disk 1031, where the SCSI protocol operation request response carries the SCSI protocol transaction identifier of the controller 101, and queries the correspondence between the MAC address of the back-end adapter 1014 and the SCSI protocol transaction identifier of the controller 101 according to the SCSI protocol transaction identifier of the controller 101 carried in the SCSI protocol operation request response. The front-end interface 1021 receives the SCSI protocol operation request response sent by the central processing unit 1022, and the front-end interface 1021 encapsulates the SCSI protocol operation request response into an Ethernet operation request response packet, where the Ethernet operation request response packet carries the MAC address of the back-end adapter 1014 and the MAC address of the front-end interface 1021. For example, a destination MAC address field carries the MAC address of the back-end adapter 1014, a source MAC address field carries the MAC address of the disk enclosure 102, a SCSI protocol transaction identifier field carries the SCSI protocol transaction identifier of the controller 101, and a SCSI protocol packet-type field carries a type of the SCSI protocol operation request. In this embodiment of the present invention, the Ethernet operation request response packet may also be called an Ethernet response packet for the Ethernet operation request packet, and both have a same meaning. In one implementation manner, in a payload of the Ethernet operation request response packet, a SCSI protocol frame data field carries the SCSI protocol operation request response; the SCSI protocol transaction identifier field of the payload carries the SCSI protocol transaction identifier of the controller; and the SCSI protocol packet-type field of the payload carries the type of the SCSI protocol operation request.

The back-end adapter 1014 of the controller 101 receives the Ethernet operation request response packet sent by the disk enclosure 102, and decapsulates the Ethernet operation request response packet, to obtain the SCSI protocol operation request response. The input/output state maintenance module of the back-end adapter 1014 determines whether the SCSI protocol operation request response is valid according to the SCSI protocol transaction identifier carried in the SCSI protocol operation request and a transaction execution state of the SCSI protocol operation request, which are recorded in the input/output state maintenance module. When it is determined that the Ethernet operation request response packet carries the SCSI protocol transaction identifier of the controller 101, the SCSI protocol operation request response is considered valid. The input/output state maintenance module of the back-end adapter 1014 updates the transaction execution state of the SCSI protocol operation request to be that the execution of the SCSI protocol transaction is complete and the link with the SCSI protocol transaction of the target disk 1031 is released.

If a SCSI protocol transaction can be completed only when the SCSI protocol transaction includes multiple SCSI protocol operation request responses, the input/output state maintenance module of the back-end adapter 1014 further needs to count the number of received SCSI protocol operation request responses. When the Ethernet operation request response packet does not carry the SCSI protocol transaction identifier of the controller 101, the SCSI protocol operation request response is discarded. That the Ethernet operation request response packet does not carry the SCSI protocol transaction identifier of the controller 101 includes: the Ethernet operation request response packet does not carry the SCSI protocol transaction identifier of the controller 101, or the SCSI protocol transaction identifier of the controller 101 carried in the Ethernet operation request response packet is inconsistent with the SCSI protocol transaction identifier of the controller 101. In one implementation manner, the SCSI protocol transaction identifier can be obtained from the SCSI protocol transaction identifier field in the payload of the Ethernet operation request response packet. In another implementation manner, if the payload of the Ethernet operation request response packet does not include the SCSI protocol transaction identifier field, the SCSI protocol transaction identifier of the controller 101 is obtained from the SCSI protocol frame data field of the payload. The back-end adapter 1014 sends the SCSI protocol operation request response to the central processing unit 1012.

During an actual implementation process, the back-end adapter 1014 shown in FIG. 10 of the embodiment, as a logical structure, may be an ASIC commercial chip or an FPGA, and includes a central processing unit and a memory, or a part of the back-end adapter 1014 may include both an ASIC commercial chip and an FPGA, and includes a first interface, a second interface, a memory, and a first central processing unit. The first interface is configured to receive a SCSI protocol operation request sent by the central processing unit 1012. The SCSI protocol operation request carries a SAS protocol address of a target disk 1031. The first central processing unit executes a computer instruction in the memory, querying a correspondence between a MAC address of a disk enclosure 102 and the SAS protocol address of the target disk 1031 according to the SAS protocol address of the target disk 1031 to obtain the MAC address of the disk enclosure 102, and encapsulating the SCSI protocol operation request into an Ethernet operation request packet. The Ethernet operation request packet carries a MAC address of the back-end adapter 1014 and the MAC address of the disk enclosure 102.

Figure 12:
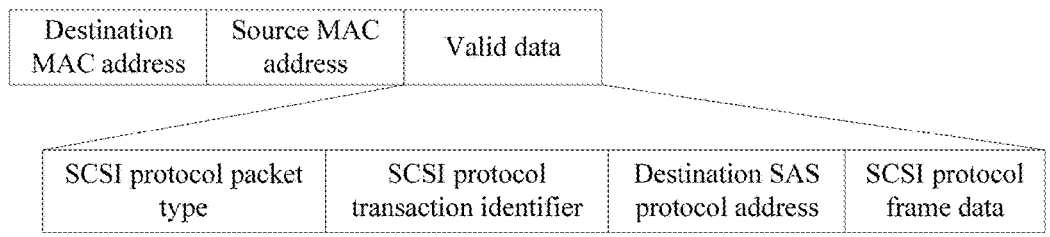
FIG. 12 is a diagram of a packet format of an Ethernet operation request into which a SCSI protocol operation request is encapsulated, according to an embodiment.

Further, the Ethernet operation request packet further includes a first field and a second field. The first field is used to carry a SCSI protocol transaction identifier. The second field is used to carry the SAS protocol address of the target disk. In the Ethernet operation request packet, the first field, the second field, and a field carrying the SCSI protocol operation request are three different fields. As shown in FIG. 12, the first field is a SCSI protocol transaction identifier field in a payload of the Ethernet operation request packet, the second field is a destination SAS protocol address field in the payload, and the field carrying the SCSI protocol operation request in the payload is a SCSI protocol frame data field. For descriptions of other fields in FIG. 12, refer to descriptions of an Ethernet operation request packet, an Ethernet operation request response packet, a heartbeat broadcast packet, and a heartbeat broadcast response packet in the embodiments.

The second interface is configured to send the Ethernet operation request packet to the disk enclosure 102 according to the MAC address of the disk enclosure 102. The second interface is further configured to receive an Ethernet response packet for the Ethernet operation request packet that is sent by the disk enclosure 102, where the Ethernet response packet for the Ethernet operation request packet carries the MAC address of the back-end adapter 1014. The first central processing unit executes the computer instruction in the memory, decapsulating the Ethernet response packet for the Ethernet operation request packet to obtain a SCSI protocol operation request response and the first interface is further configured to send the SCSI protocol operation request response to the central processing unit 1012. Further, the Ethernet response packet for the Ethernet operation request packet further carries the SCSI protocol transaction identifier of the controller 101. The first central processing unit executes the computer instruction in the memory, recording a transaction execution state of the SCSI protocol operation request. When the Ethernet operation request packet is sent to the disk enclosure 102, recording the transaction execution state of the SCSI protocol operation request as establishing a link with a SCSI protocol transaction of the target disk 1031 and executing the SCSI protocol transaction.

Further, the first central processing unit executes the computer instruction in the memory, updating, according to the SCSI protocol operation request response, the transaction execution state of the SCSI protocol operation request to be that the execution of the SCSI protocol transaction is complete and the link with the SCSI protocol transaction of the target disk 1031 is released.

Further, the first central processing unit executes the computer instruction in the memory, discarding the SCSI protocol operation request response when the Ethernet operation request response packet does not carry the SCSI protocol transaction identifier of the controller 101.

Further, the first interface is a PCIe interface.

Figure 13:
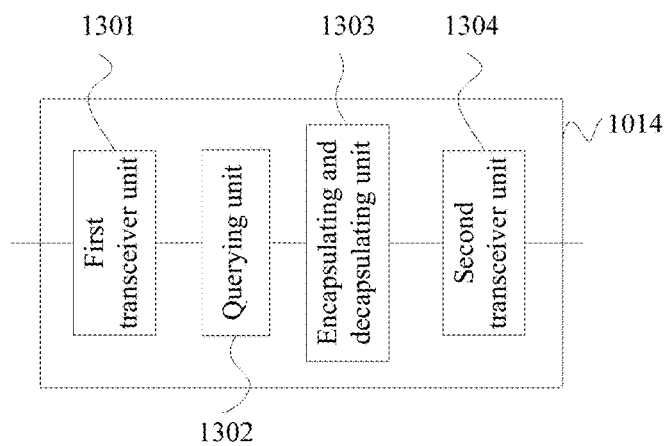
FIG. 13 is a diagram of a back-end adapter embodiment.

A back-end adapter 1014 shown in FIG. 11 may be logically divided according to a structure shown in FIG. 13, and includes a first transceiver unit 1301, a querying unit 1302, an encapsulating and decapsulating unit 1303, and a second transceiver unit 1304. The first transceiver unit 1301 is configured to receive a SCSI protocol operation request sent by a central processing unit 1012, where the SCSI protocol operation request carries a SAS protocol address of a target disk 1031. The querying unit 1302 is configured to query a correspondence between a MAC address of a disk enclosure 102 and the SAS protocol address of the target disk 1031 to obtain the MAC address of the disk enclosure 102. The encapsulating and decapsulating unit 1303 is configured to encapsulate the SCSI protocol operation request into an Ethernet operation request packet, where the Ethernet operation request packet carries a MAC address of the back-end adapter 1014 and the MAC address of the disk enclosure 102. The second transceiver unit 1304 is configured to send the Ethernet operation request packet to the disk enclosure 102 according to the MAC address of the disk enclosure 102. Further, the SCSI protocol operation request further carries a SCSI protocol transaction identifier of the controller 101, and the encapsulating and decapsulating unit 1303 is further configured to encapsulate the SCSI protocol transaction identifier of the controller 101 into a first field of the Ethernet operation request packet, and encapsulate the SAS protocol address of the target disk into a second field, where the first field, the second field, and a field that is in the Ethernet operation request packet and carries the SCSI protocol operation request are three different fields.

Further, the second transceiver unit 1304 is further configured to receive an Ethernet response packet for the Ethernet operation request packet that is sent by the disk enclosure 102, where the Ethernet response packet for the Ethernet operation request packet carries the MAC address of the back-end adapter 1014. Further, the encapsulating and decapsulating unit 1303 is further configured to decapsulate the Ethernet response packet for the Ethernet operation request packet, to obtain a SCSI protocol operation request response. The first transceiver unit 1301 is further configured to send the SCSI protocol operation request response to the central processing unit 1012. The back-end adapter 1014 further includes a recording unit 1304 that is configured to record a transaction execution state of the SCSI protocol operation request. When the Ethernet operation request packet is sent to the disk enclosure 102, the recording unit 1304 records the transaction execution state of the SCSI protocol operation request as establishing a link with a SCSI protocol transaction of the target disk 1031 and executing the SCSI protocol transaction. Further, the recording unit 1304 is further configured to update, according to the SCSI protocol operation request response, the transaction execution state of the SCSI protocol operation request to be that the execution of the SCSI protocol transaction is complete and the link with the SCSI protocol transaction of the target disk 1031 is released. Further, the first transceiver unit 1301 is further configured to discard the SCSI protocol operation request response when the Ethernet operation request response packet does not carry the SCSI protocol transaction identifier of the controller 101.

Further, the correspondence between the MAC address of the disk enclosure 102 and the SAS protocol address of the target disk 1031 is established by the back-end adapter 1014 according to resource information sent by the disk enclosure 102, where the resource information includes the MAC address of the disk enclosure 102 and the SAS protocol address of the target disk 1031, and is implemented using a heartbeat broadcast packet response sent by the disk enclosure 102.

Figure 14:
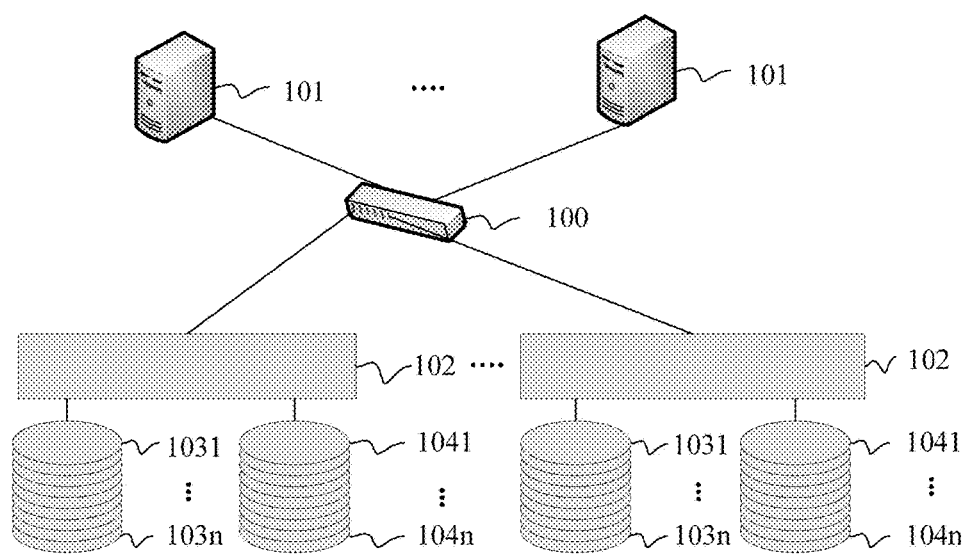
FIG. 14 is a diagram of a storage system embodiment.

Further, the controller 101 and the disk enclosure 102 described in this embodiment of the present invention may form a storage system shown in FIG. 14, where the storage system includes multiple controllers 101 and multiple disk enclosures 102. The number of the controllers 101 and the number of the disk enclosures 102 may be determined according to an actual requirement. The multiple controllers 101 communicate with the multiple disk enclosures 102 using an Ethernet switch 100. In addition, a redundancy relationship is formed between the controllers 101 to improve reliability. Flexible system expansion can be implemented using the controllers 101 and disk enclosures 102 provided by this embodiment of the present invention.

In this embodiment of the present invention, both the SCSI protocol operation request and the SCSI protocol operation request response are SCSI protocol packets. The SAS protocol is an interface protocol, that is, a serial SCSI protocol is used, and devices using SAS interfaces use the SCSI protocol for communication. In this embodiment of the present invention, disks 1031 . . . 103*n*, 1041 . . . 104*n* are disks using SAS protocol interfaces, a disk enclosure 102 also uses a SAS protocol interface to connect to the disks 1031 . . . 103*n*, 1041 . . . 104*n*, and the disk enclosure 102 communicates with the disks 1031 . . . 103*n*, 1041 . . . 104*n* using the SCSI protocol. A SCSI protocol transaction link is a link established for communication between an initiator and a target in the SCSI protocol, and the link is released when the communication ends, thereby releasing SCSI protocol resources. A to-be-executed transaction for which the link is established is a SCSI protocol transaction, that is, a corresponding SCSI protocol operation request.

In this embodiment of the present invention, a SCSI protocol transaction identifier is encapsulated into a first field of the Ethernet operation request packet, which is described as that the first field of the Ethernet operation request packet carries the SCSI protocol transaction identifier of the controller; and the SAS protocol address of the target disk is encapsulated into a second field of the Ethernet operation request packet, which is described as that the second field of the Ethernet operation request packet carries the SAS protocol address of the target disk.

Descriptions of the central processing unit and the first central processing unit used in this embodiment of the present invention are only used to clearly indicate that the central processing unit and the first central processing unit belong to different apparatuses, and the central processing unit and the first central processing unit may be a same processor or different processors, which is specifically selected according to technical requirements and is not limited by this embodiment of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present application, it should be understood that the disclosed system and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable non-volatile storage medium. Based on such an understanding, the technical solutions of the present invention essentially, or the part contributing to the prior art, or some of the technical solutions may be implemented in a form of a software product. The software product is stored in a non-volatile storage medium, and includes several instructions for instructing a computer device (which may be a personal computer, a server, or a network device) to perform all or some of the steps of the methods described in the embodiments of the present invention. The foregoing non-volatile storage medium includes: any medium that can store a program code, such as a USB flash drive, a removable hard disk, a read-only memory (ROM), a magnetic disk, or an optical disc.

The foregoing descriptions are merely specific implementation manners of the present invention, but are not intended to limit the protection scope of the present invention.

What is claimed is:

1. A storage system for processing an operation request, the storage system comprising:
   a disk enclosure including multiple disks connected to the disk enclosure, with each disk in the disk enclosure configured to communicate using a Serial Attached Small Computer System Interface (SAS) protocol; and
   a controller comprising a central processing unit and a back-end adapter, wherein the controller communicates with the disk enclosure using an Ethernet network, wherein the disk enclosure and the back-end adapter each have a media access control (MAC) address;
   the back-end adapter is configured to:
     receive a Small Computer System Interface (SCSI) protocol operation request sent by the central processing unit, wherein the SCSI protocol operation request includes a SAS protocol address of the target disk;
     obtain the MAC address of the disk enclosure according to the SAS protocol address of the target disk;
     encapsulate the SCSI protocol operation request into an Ethernet operation request packet; and
     send the Ethernet operation request packet to the disk enclosure according to the MAC address of the disk enclosure, wherein the Ethernet operation request packet includes the MAC address of the back-end adapter and the MAC address of the disk enclosure;
   the disk enclosure is configured to:
     receive and decapsulate the Ethernet operation request packet to obtain the SCSI protocol operation request; and
     send the SCSI protocol operation request to the target disk according to the SAS protocol address of the target disk.

2. The system according to claim 1, wherein the SCSI protocol operation request includes a SCSI protocol transaction identifier of the controller, the disk enclosure is further configured to:
   establish a correspondence between the MAC address of the back-end adapter and the SCSI protocol transaction identifier of the controller;
   receive a SCSI protocol operation request response that is sent by the target disk according to the SCSI protocol operation request, wherein the SCSI protocol operation request response includes the SCSI protocol transaction identifier of the controller;
   query the correspondence between the MAC address of the back-end adapter and the SCSI protocol transaction identifier of the controller according to the SCSI protocol transaction identifier of the controller to obtain the MAC address of the back-end adapter;

encapsulate the SCSI protocol operation request response into an Ethernet operation request response packet; and send the Ethernet operation request response packet to the controller according to the MAC address of the back-end adapter, wherein the Ethernet operation request response packet includes the MAC address of the back-end adapter; and the back-end adapter is further configured to:

receive and decapsulate the Ethernet operation request response packet to obtain the SCSI protocol operation request response; and send the SCSI protocol operation request response to the central processing unit.

3. The system according to claim 2, wherein the back-end adapter is further configured to:

encapsulate the SCSI protocol transaction identifier of the controller in the SCSI protocol operation request into a first field of the Ethernet operation request packet; and encapsulate the SAS protocol address of the target disk in the SCSI protocol operation request into a second field of the Ethernet operation request packet, wherein the first field, the second field, and a field carrying the SCSI protocol operation request are three different fields;

the disk enclosure establishing a correspondence between the MAC address of the back-end adapter and the SCSI protocol transaction identifier of the controller comprises:

the disk enclosure decapsulates the first field of the Ethernet operation request packet to obtain the SCSI protocol transaction identifier of the controller; and the disk enclosure establishes the correspondence between the MAC address of the back-end adapter and the SCSI protocol transaction identifier of the controller; and the disk enclosure sending the SCSI protocol operation request to the target disk according to the SAS protocol address of the target disk comprises:

the disk enclosure decapsulates the second field of the Ethernet operation request packet to obtain the SAS protocol address of the target disk; and the disk enclosure sends the SCSI protocol operation request to the target disk according to the SAS protocol address of the target disk.

4. The system according to claim 3, wherein the back-end adapter is further configured to record a transaction execution state of the SCSI protocol operation request, wherein when sending the Ethernet operation request packet to the disk enclosure, the back-end adapter records the transaction execution state of the SCSI protocol operation request as establishing a link with a SCSI protocol transaction of the target disk and executing the SCSI protocol transaction.

5. The system according to claim 4, wherein the back-end adapter is further configured to update, according to the SCSI protocol operation request response, the transaction execution state of the SCSI protocol operation request to be that the execution of the SCSI protocol transaction is complete and the link with the SCSI protocol transaction of the target disk is released.

6. The system according to claim 4, wherein when the Ethernet operation request response packet does not carry the SCSI protocol transaction identifier of the controller, the back-end adapter is further configured to discard the SCSI protocol operation request response.

7. The system according to claim 1, wherein the correspondence between the MAC address of the disk enclosure and the SAS protocol address of the target disk is established by the back-end adapter according to resource information sent by the disk enclosure, and the resource information comprises the MAC address of the disk enclosure and the SAS protocol address of the target disk.

8. A method for processing an operation request, comprising:

a controller communicating with a disk enclosure using an Ethernet network, the controller comprising a central processing unit and a back-end adapter, wherein the disk enclosure and the back-end adapter each have a media access control (MAC) address and wherein multiple disks are connected in the disk enclosure, with each disk in the disk enclosure configured to communicate using a Serial Attached Small Computer System Interface (SAS) protocol;

the central processing unit sending a Small Computer System Interface (SCSI) protocol operation request, wherein the SCSI protocol operation request includes a SAS protocol address of a target disk;

the back-end adapter receiving the SCSI protocol operation request sent by the central processing unit;

the back-end adapter obtaining the MAC address of the disk enclosure according to the SAS protocol address of the target disk to obtain the MAC address of the disk enclosure;

the back-end adapter encapsulating the SCSI protocol operation request into an Ethernet operation request packet carrying the MAC address of the back-end adapter and the MAC address of the disk enclosure; and the back-end adapter sending the Ethernet operation request packet to the disk enclosure according to the MAC address of the disk enclosure.

9. The method according to claim 8, wherein the SCSI protocol operation request further includes a SCSI protocol transaction identifier of the controller and the method further comprises:

the back-end adapter encapsulating the SCSI protocol transaction identifier of the controller into a first field of the Ethernet operation request packet; and the back-end adapter encapsulating the SAS protocol address of the target disk into a second field of the Ethernet operation request packet, wherein the first field, the second field, and a field that is in the Ethernet operation request packet and includes the SCSI protocol operation request are three different fields.

10. The method according to claim 9, wherein the method further comprises:

receiving and decapsulating, by the back-end adapter, an Ethernet response packet for the Ethernet operation request packet that is sent by the disk enclosure, to obtain a SCSI protocol operation request response;

sending, by the back-end adapter, the SCSI protocol operation request response to the central processing unit, wherein the Ethernet response packet for the Ethernet operation request packet includes the MAC address of the back-end adapter; and receiving, by the central processing unit, the SCSI protocol operation request response.

11. The method according to claim 10, wherein when sending the Ethernet operation request packet to the disk enclosure, the back-end adapter records the transaction execution state of the SCSI protocol operation request as establishing a link with a SCSI protocol transaction of the target disk and executing the SCSI protocol transaction.

12. The method according to claim 11, wherein the method further comprises:

updating, by the back-end adapter according to the SCSI protocol operation request response, the transaction execution state of the SCSI protocol operation request to indicate the execution of the SCSI protocol transaction is complete and the link with the SCSI protocol transaction of the target disk is released.

13. The method according to claim 11, wherein when the Ethernet response packet for the Ethernet operation request packet does not carry the SCSI protocol transaction identifier of the controller, the SCSI protocol operation request response is discarded.

14. The method according to claim 8, wherein the correspondence between the MAC address of the disk enclosure and the SAS protocol address of the target disk is established by the back-end adapter according to resource information sent by the disk enclosure, and the resource information comprises the MAC address of the disk enclosure and the SAS protocol address of the target disk.

15. A back-end adapter of a controller of a storage system, wherein the back-end adapter communicates with a disk enclosure of the storage system using an Ethernet network, with the back-end adapter comprising:
  a first interface configured to receive a Small Computer System Interface (SCSI) protocol operation request, wherein the SCSI protocol operation request includes a Serial Attached Small Computer System Interface (SAS) protocol address of a target disk, with multiple disks being connected in the disk enclosure and with each disk in the disk enclosure configured to communicate using the SAS protocol;
  a second interface configured to send a Ethernet operation request packet to a disk enclosure of the storage system according to a MAC address of the disk enclosure, wherein the disk enclosure and the back-end adapter each have a media access control (MAC) address; and
  a first central processing unit coupled to the first interface and the second interface, with the first central processing unit configured to:
    obtain the MAC address of the disk enclosure according to the SAS protocol address of the target disk; and
    encapsulate the SCSI protocol operation request into the Ethernet operation request packet, wherein the Ethernet operation request packet includes the MAC address of the back-end adapter and the MAC address of the disk enclosure.

16. The back-end adapter according to claim 15, wherein the SCSI protocol operation request further includes a SCSI protocol transaction identifier of the controller, with the first central processing unit encapsulating the SCSI protocol transaction identifier of the controller into a first field of the Ethernet operation request packet and encapsulating the SAS protocol address of the target disk into a second field, wherein the first field, the second field, and a field that is in the Ethernet operation request packet and includes the SCSI protocol operation request are three different fields.

17. The back-end adapter according to claim 16, wherein the second interface is further configured to receive an Ethernet response packet for the Ethernet operation request packet that is sent by the disk enclosure, wherein the Ethernet response packet for the Ethernet operation request packet includes the MAC address of the back-end adapter, the back-end adapter further comprising:
  the first central processing unit further configured to decapsulate the Ethernet response packet for the Ethernet operation request packet to obtain a SCSI protocol operation request response; and
  the first interface is further configured to send the SCSI protocol operation request response to the central processing unit.

18. The back-end adapter according to claim 17, wherein the first central processing unit is further configured to:
  record a transaction execution state of the SCSI protocol operation request when the Ethernet operation request packet is sent to the disk enclosure, with the first central processing unit recording the transaction execution state of the SCSI protocol operation request as establishing a link with a SCSI protocol transaction of the target disk and executing the SCSI protocol transaction.

19. The back-end adapter according to claim 18, wherein the first central processing unit is further configured to:
  update, according to the SCSI protocol operation request response, the transaction execution state of the SCSI protocol operation request to be that the execution of the SCSI protocol transaction is complete and the link with the SCSI protocol transaction of the target disk is released.

20. The back-end adapter according to claim 18, wherein the first central processing unit is further configured to:
  discard the SCSI protocol operation request response when the Ethernet response packet for the Ethernet operation request packet does not carry the SCSI protocol transaction identifier of the controller.

* * * * *